United States Patent
Shen et al.

(10) Patent No.: US 12,513,702 B2
(45) Date of Patent: Dec. 30, 2025

(54) RESOURCE SCHEDULING METHOD, APPARATUS AND STORAGE MEDIUM

(71) Applicant: GUANGDONG OPPO MOBILE TELECOMMUNICATIONS CORP., LTD., Guangdong (CN)

(72) Inventors: Jia Shen, Dongguan (CN); Wenqiang Tian, Dongguan (CN)

(73) Assignee: GUANGDONG OPPO MOBILE TELECOMMUNICATINS CORP., LTD., Guangdong (CN)

( * ) Notice: Subject to any disclaimer, the term of this patent is extended or adjusted under 35 U.S.C. 154(b) by 454 days.

(21) Appl. No.: 17/863,348

(22) Filed: Jul. 12, 2022

(65) Prior Publication Data

US 2022/0346132 A1   Oct. 27, 2022

Related U.S. Application Data

(63) Continuation of application No. PCT/CN2020/072053, filed on Jan. 14, 2020.

(51) Int. Cl.
*H04W 72/23*   (2023.01)
*G06N 20/00*   (2019.01)
(Continued)

(52) U.S. Cl.
CPC ............ *H04W 72/23* (2023.01); *G06N 20/00* (2019.01); *H04W 72/121* (2013.01); *G06F 9/5027* (2013.01); *G06F 2209/501* (2013.01)

(58) Field of Classification Search
CPC . H04W 72/121; H04W 72/23; H04W 72/542; G06F 2209/501; G06F 2209/508; G06F 9/5027; G06N 20/00
See application file for complete search history.

(56) References Cited

U.S. PATENT DOCUMENTS 11,341,429 B1 *  5/2022  Pihur ..................... G06N 5/04
11,405,088 B2 *  8/2022  Bai ..................... H04W 72/23
(Continued)

FOREIGN PATENT DOCUMENTS

CN   107688493 A      2/2018
CN   109189825 A  *   1/2019
(Continued)

OTHER PUBLICATIONS

Nilsson et al., "A Performance Evaluation of Federated Learning Algorithms", in Proc. 2nd Workshop Distrib. Infrastruct. Deep Learn. (DIDL), Dec. 2018, pp. 1-8 (Year: 2018).*
(Continued)

Primary Examiner — Shah M Rahman
(74) Attorney, Agent, or Firm — Ladas & Parry, LLP

(57) ABSTRACT

A resource scheduling method, an apparatus and a readable storage medium. In a process in which a terminal device participates in federated learning, a network device first generates first information, the first information including configuration information, and specifically, the configuration information is used to indicate characteristics of sample data, and/or, characteristics of a model to be trained for the terminal device to perform model training; and then, the network device sends the first information to the terminal device, and the terminal device acquires the configuration information in the first information. In the present embodiment, the network device determines, according to a data processing capability and/or a data transmission capability of the terminal device, that the terminal device participates in a current round of federated learning, and generates and sends the configuration information of a training parameter that matches the terminal device.

14 Claims, 19 Drawing Sheets

(51) Int. Cl.
*H04W 72/121* (2023.01)
*G06F 9/50* (2006.01)

(56) References Cited

U.S. PATENT DOCUMENTS

| | | | | |
|---|---|---|---|---|
| 11,537,439 | B1* | 12/2022 | Liberty | G06F 9/5077 |
| 11,681,913 | B2* | 6/2023 | Han | G06N 3/08 |
| | | | | 706/20 |
| 11,934,874 | B2* | 3/2024 | Patel | G06N 20/00 |
| 2018/0025289 | A1* | 1/2018 | Doshi | G06N 20/00 |
| | | | | 706/12 |
| 2019/0132708 | A1* | 5/2019 | Belghoul | H04L 12/1845 |
| 2019/0244138 | A1* | 8/2019 | Bhowmick | G06N 3/045 |
| 2019/0318240 | A1* | 10/2019 | Kulkarni | G06N 3/08 |
| 2021/0073639 | A1* | 3/2021 | Jakkam Reddi | G06N 3/084 |
| 2021/0117780 | A1* | 4/2021 | Malik | G06F 40/30 |
| 2021/0203615 | A1* | 7/2021 | Roy | G06N 20/00 |
| 2021/0248487 | A1* | 8/2021 | Zheng | G06N 5/027 |
| 2022/0052925 | A1* | 2/2022 | Vandikas | G06N 3/04 |
| 2022/0108177 | A1* | 4/2022 | Samek | G06N 3/045 |
| 2022/0330072 | A1* | 10/2022 | Zeng | H04W 24/10 |
| 2023/0010095 | A1* | 1/2023 | Alabbasi | H04L 41/145 |
| 2023/0013340 | A1* | 1/2023 | Wu | G06N 3/04 |
| 2023/0041074 | A1* | 2/2023 | Moradi | G06N 20/00 |
| 2023/0370491 | A1* | 11/2023 | Crabtree | G06N 3/098 |

FOREIGN PATENT DOCUMENTS

| | | | | |
|---|---|---|---|---|
| CN | 109902820 | A | | 6/2019 |
| CN | 110008696 | A | | 7/2019 |
| CN | 110263921 | A | | 9/2019 |
| CN | 110263936 | A | | 9/2019 |
| CN | 110378487 | A | | 10/2019 |
| CN | 110610242 | A | | 12/2019 |
| CN | 110705177 | A | * 1/2020 | G06K 9/6256 |
| WO | 2021142627 | A1 | | 7/2021 |

OTHER PUBLICATIONS

B. McMahan et al., "Communication-efficient learning of deep networks from decentralized data," in Proc. Int. Conf. Artif. Intell. Statist., 2017, pp. 1273-1282. (Year: 2017).*
Y. Zhao et al., "Federated learning with non-IID data," 2018. [Online]. Available: http://arXiv:1806.00582, pp. 1-12 (Year: 2018).*
Nishio et al, "Client selection for federated learning with heterogeneous resources in mobile edge", XP002804266, Jan. 1, 2019, entire document.
The EESR of corresponding European application No. 20914605.9, dated Jan. 2, 2023.
International Search Report (ISR) dated Jul. 22, 2021 for Application No. PCT/CN2020/072053, and its English Translation provided by WIPO.
Written Opinion (WO) dated Jul. 22, 2021 for Application No. PCT/CN2020/072053, and its English Translation provided by Google Translate.
The first office action of corresponding European application No. 20914605.9, dated Jan. 10, 2025.

* cited by examiner

RESOURCE SCHEDULING METHOD, APPARATUS AND STORAGE MEDIUM

CROSS-REFERENCE TO RELATED APPLICATIONS

This application is a continuation of International Application No. PCT/CN2020/072053, filed on Jan. 14, 2020, the disclosure of which is hereby incorporated by reference in its entirety.

TECHNICAL FIELD

Embodiments of the present application relate to the technical field of communication, and in particular, to a resource scheduling method, an apparatus and a readable storage medium.

BACKGROUND

With the rapid development of artificial intelligence (AI), AI also undertakes more and more important tasks in terminal devices, such as image processing, video calling, augmented reality (AR)/virtual reality (VR), taking pictures, etc., and machine learning (ML) technology is one of the core technologies of AI. Therefore, the performance of AI/ML model is of great significance to artificial intelligence. Under this background, people put forward a concept of "federated learning", in which the purpose of federated learning is to conduct efficient machine learning among multi-participants or multi-computing nodes on the premise of ensuring information security and protecting the privacy of terminal device data and personal data, so as to optimize the AI/ML model.

In the existing federated learning, the resource scheduling of federated learning is usually based on wired networks, such as the Ethernet and optical fiber networks, etc., so that each participant or computing node has high reliability. However, in the case of wireless networks, especially in the 5G networks currently under study and other wireless networks that may appear in the future, there is no feasible solution for how to schedule a training parameter of terminal devices in the process of federated learning based on terminal devices and network devices.

SUMMARY

Embodiments of the present application provide a resource scheduling method, an apparatus and a readable storage medium, so as to implement scheduling of a training parameter for a terminal device in a process of federated learning.

In a first aspect, embodiments of the present application may provide a resource scheduling method, including:
  receiving, by a terminal device, first information from a network device, where the first information includes configuration information, and the configuration information is used to indicate any one or any combination of characteristics of sample data, and characteristics of a model to be trained for the terminal device to perform model training; and
  acquiring, by the terminal device, the configuration information.

In a second aspect, embodiments of the present application may provide a resource scheduling method, including:
  generating, by a network device, first information, where the first information includes configuration information, and the configuration information is used to indicate any one or any combination of characteristics of sample data, and characteristics of a model to be trained for a terminal device to perform model training; and
  sending, by the network device, the first information to the terminal device.

In a third aspect, embodiments of the present application may provide a terminal device, including:
  a transceiving module, configured to receive first information from a network device, where the first information includes configuration information, and the configuration information is used to indicate any one or any combination of characteristics of sample data, and characteristics of a model to be trained for the terminal device to perform model training; and
  a processing module, configured to acquire the configuration information.

In a fourth aspect, embodiments of the present application may provide a network device, including:
  a processing module, configured to generate first information, where the first information includes configuration information, and the configuration information is used to indicate any one or any combination of characteristics of sample data, and characteristics of a model to be trained for a terminal device to perform model training; and
  a transceiving module, configured to send the first information to the terminal device.

In a fifth aspect, embodiments of the present application may further provide a terminal device, including:
  a processor, a memory, and an interface for communicating with a network device;
  the memory stores a computer-executable instruction;
  the processor executes the computer-executable instruction stored in the memory to cause the processor to perform the resource scheduling method according to any one of the first aspect.

In a sixth aspect, embodiments of the present application may further provide a network device, including:
  a processor, a memory, and an interface for communicating with a network device;
  the memory stores a computer-executable instruction;
  the processor executes the computer-executable instruction stored in the memory to cause the processor to perform the resource scheduling method according to any one of the second aspect.

In a seventh aspect, embodiments of the present application provide a computer-readable storage medium, where the computer-readable storage medium stores a computer-executable instruction, and the computer-executable instruction is used to, when executed by a processor, implement the resource scheduling method according to any one of the first aspect.

In an eighth aspect, embodiments of the present application provide a computer-readable storage medium, where the computer-readable storage medium stores a computer-executable instruction, and the computer-executable instruction is used to, when executed by a processor, implement the resource scheduling method according to any one of the second aspect.

In a ninth aspect, embodiments of the present application provide a program, and the program is used to, when executed by a processor, perform the resource scheduling method according to any one of the first aspect.

In a tenth aspect, embodiments of the present application provide a program, and the program is used to, when executed by a processor, perform the resource scheduling method according to any one of the second aspect.

In an eleventh aspect, embodiments of the present application provide a computer program product, including: a program instruction used to implement the resource scheduling method according to any one of the first aspect.

In a twelfth aspect, embodiments of the present application provide a computer program product, including: a program instruction used to implement the resource scheduling method according to any one of the second aspect.

In a thirteenth aspect, embodiments of the present application provide a chip, including: a processing module and a communicating interface, where the processing module can perform the resource scheduling method according to any one of the first aspect.

Further, the chip further includes a storing module (for example, a memory) used to store instructions, and the processing module is used to execute the instructions stored in the storing module to cause the processing module to perform the resource scheduling method according to any one of the first aspect.

In a fourteenth aspect, embodiments of the present application provide a chip, including: a processing module and a communicating interface, where the processing module can perform the resource scheduling method according to any one of the second aspect.

Further, the chip further includes a storing module (for example, a memory) used to store instructions, and the processing module is used to execute the instructions stored in the storing module to cause the processing module to perform the resource scheduling method according to any one of the second aspect.

In a fifteenth aspect, embodiments of the present application further provide a communication system, including: a network device and at least one terminal device, where the at least one terminal device is used to perform the method according to any one of the above first aspect, and the network device is used to perform the method according to any one of the above second aspect.

Embodiments of the present application provide a resource scheduling method, an apparatus and a readable storage medium. In a process in which a terminal device participates in federated learning, a network device first generates first information, the first information including configuration information, and specifically, the configuration information is used to indicate characteristics of sample data, and/or, characteristics of a model to be trained for the terminal device to perform model training; and then, the network device sends the first information to the terminal device, and the terminal device acquires the configuration information in the first information. In the embodiments of the present application, the network device determines, according to a data processing capability and/or a data transmission capability of the terminal device, that the terminal device participates in a current round of federated learning, and generates and sends the configuration information of the training parameter that matches the terminal device, thereby realizing scheduling of the training parameter in a wireless network.

BRIEF DESCRIPTION OF DRAWINGS

In order to explain the embodiments of the present application or the technical solutions in the prior art more clearly, the following will briefly introduce the drawings that need to be used in the description of the embodiments or the prior art. Obviously, the drawings in the following description are some embodiments of the present application, and for those of ordinary skills in the art, other drawings can be obtained according to these drawings without making creative efforts.

DESCRIPTION OF EMBODIMENTS

In order to make the purpose, technical solution and advantages of embodiments of the present application clearer, the technical solution in the embodiments in the present application will be clearly and completely described below with reference to the drawings in the embodiments of the present application. Obviously, the described embodiments are part of the embodiments of the present application, not all of them. Based on the embodiments in the present application, all other embodiments obtained by those of ordinary skills in the art without making creative efforts are within the scope of protection of the present application.

The terms "first", "second" and so on in the specification, claims and the above drawings of the embodiments of the present application are used to distinguish similar objects, but are not necessarily used to describe a specific order or sequence. In addition, the terms "including" and "having" and any variations thereof are intended to cover non-exclusive inclusion, for example, processes, methods, systems, products or equipment containing a series of steps or units need not be limited to those steps or units explicitly listed, but may include other steps or units not explicitly listed or inherent to these processes, methods, products or equipment.

With the rapid development of AI, AI undertakes more and more important tasks in terminal devices such as smart phones, unmanned aerial vehicles and intelligent robots, etc., for example, AI tasks such as image processing, video calling, AR/VR, taking pictures and so on. When the terminal device performs AI tasks, it is usually implemented according to an AI/ML, model, so the performance of the AI/ML, model is of great significance to artificial intelligence. Under this background, people put forward a concept of "federated learning", in which the purpose of federated learning is to conduct efficient machine learning among multi-participants or multi-computing nodes on the premise of ensuring information security and protecting the privacy of terminal device data and personal data, so as to optimize the AI/ML model.

Figure 1:
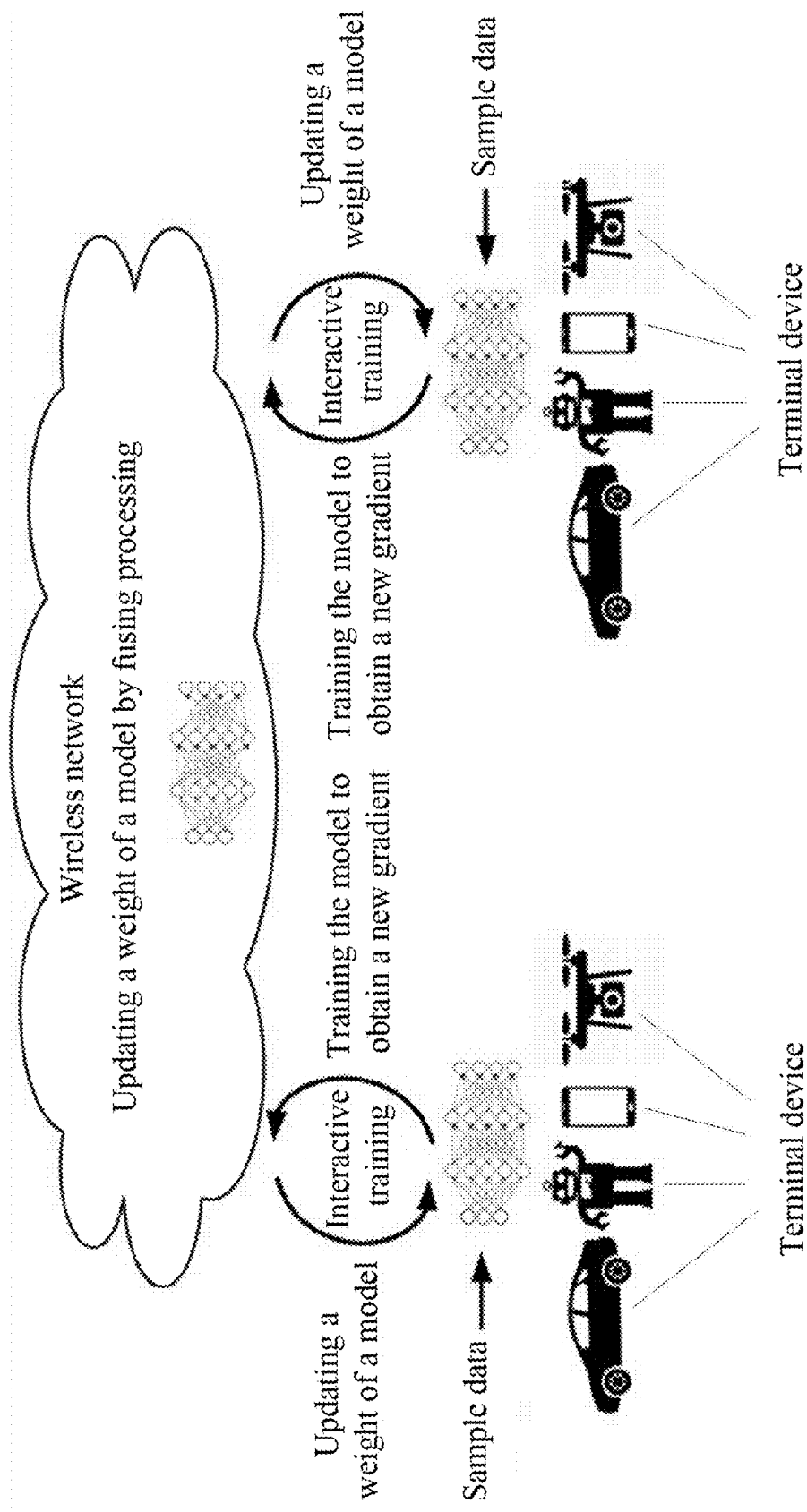
FIG. 1 is a scenario schematic diagram of federated learning based on terminal devices provided by the present application.
Figure 2:
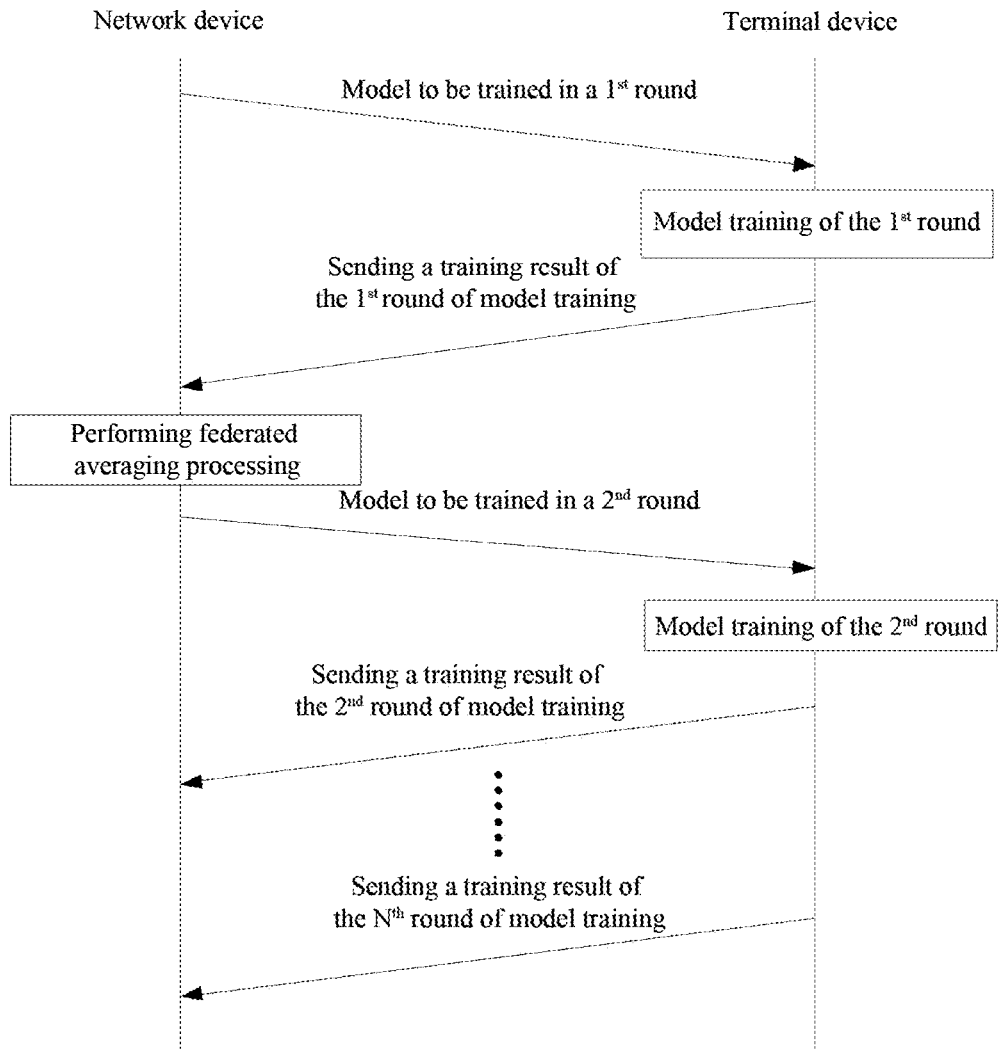
FIG. 2 is a flowchart of multiple-rounds training of federated learning provided by the present application.

Due to uniqueness of environment where the terminal device is located, sample data collected by the terminal device is very valuable for training widely available general models. However, due to reasons such as protection of data privacy, etc., the terminal device cannot send its own sample data to a network device, therefore, a terminal-device-based mode needs to be adopted for performing federated learning. FIG. 1 is a scenario schematic diagram of federated learning based on terminal devices provided by the present application, FIG. 2 is a flowchart of multiple-rounds training of federated learning provided by the present application; with reference to FIG. 1 and FIG. 2, a network device sends a model to be trained to multiple terminal devices first, the respective terminal devices perform model training according to stored sample data and the model to be trained, to obtain training results, and send the training results to the network device, and the network device performs fusing processing according to the training results sent by the multiple terminal devices respectively, to form a new model to be trained; and then, the network device sends the new model to be trained to the multiple terminal devices respectively, and then the terminal device performs model training according to the stored sample data and the new model to be trained, to obtain training results, and sends the training results to the network device, and the above procedure is repeatedly executed until accuracy of the model satisfies requirements, and then the federated learning can be terminated. Federated learning can not only effectively use data resources stored in the terminal device, but also make full use of hardware resources of the terminal device. Therefore, federated learning has a prominent development prospect.

In a process of federated learning, transmission of the AI model/ML model (i.e. the above mentioned model to be trained) on a communication network will gradually become one of important services in the communication network. In an existing process of federated learning, the network device schedules training resources of the connected terminal devices based on a wired network. These terminal devices (also referred to as computing nodes, participants or other names) generally have consistent communication capability, data processing capability and storage capability, and the network device communicates with the respective terminal devices through a wired network, so a wireless environment where the terminal devices are located needs not to be considered. Therefore, in the wired network, the network device only needs to consider small probability events such as downtime and power failure of certain terminal devices. In some cases, "downtime" can also be referred to as crash or collapse or other names.

However, in a wireless network, due to factors such as wireless environment or movement of the terminal device within the network coverage area, it may result in abnormal connection between the terminal device and the network device. In addition, chip processing resources, storage resources, etc., allocated by the terminal device to federated learning may also change constantly with occupation of other tasks of the terminal device itself. Therefore, when federated learning is performed, the resource scheduling method in the wired network cannot be adapted to the wireless network.

In addition, some other resource scheduling algorithms also exist in the prior art, but these algorithms are usually used to allocate wireless resources (for example, time-frequency domain resources) and wireless parameters (for example, modulation and coding method, MIMO mode etc.), and cannot perform dynamic scheduling on related training parameters for the terminal device to train models, and cannot dynamically schedule, according to change of the wireless environment, computing and storing resources, etc., for the terminal device to perform model training, thus leading to that the computing and storage resources of the terminal device do not match with the wireless environment. MIMO (multiple input multiple output) represents multiple input multiple output.

Therefore, embodiments of the present application provide a resource scheduling method, to realize that the network device schedules a parameter used by the terminal device participating in federated learning to perform model training.

In the following, the resource scheduling method provided by the present application will be described in detail.

Figure 3:
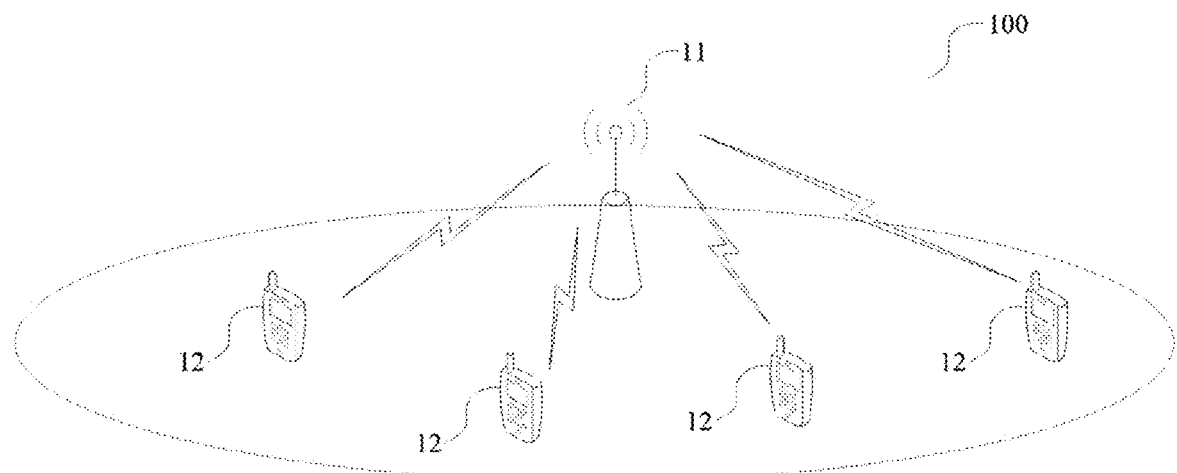
FIG. 3 is a schematic diagram of a communication system applied in an embodiment of the present application.

FIG. 3 is a schematic diagram of a communication system applied in an embodiment of the present application. As shown in FIG. 3, the communication system 100 at least includes a network device 11 and a terminal device 12. It could be understood that, in an actual communication system, both the network device 11 and the terminal device 12 may be one or more, and FIG. 3 is only taken one as an example.

In FIG. 3, the network device 11 may be an access device in a cellular network, for example, the access device in a long term evolution (LTE) network and an evolved network thereof, for example, an evolutional base station (Evolutional Node B, abbreviated as eNB or eNodeB), or a relay station, or a base station in a new network system in the future. The network device may also be devices such as an access point (abbreviated as AP) in WLAN, etc.

The terminal device 12 may also be referred to as a mobile terminal, a user equipment (User Equipment, abbreviated as UE), a participant, a computing node, a participating node, an access terminal, a user unit, a user station, a mobile station, a mobile platform, a user terminal, a terminal, a wireless communication device, a user agent or a user apparatus. The terminal device 12 may be, for example, an intelligent mobile phone, a computer, a cellular phone, a cordless phone, a personal digital assistant (abbreviated as PDA) device, a handheld device with wireless communication function, or other processing devices, vehicle-mounted devices and wearable devices connected to a wireless modem, etc. In the embodiment of the present application, the terminal device has an interface for communicating with the network device (for example, the cellular network).

The resource scheduling method provided by the present application includes: a network device first generates first information, the first information including configuration information, and specifically, the configuration information is used to indicate characteristics of sample data, and/or, characteristics of a model to be trained for the terminal device to perform model training; and then, the network device sends the first information to the terminal device, and the terminal device acquires the configuration information of the training parameter included in the first information.

The purpose of the resource scheduling method of the present solution is to ensure that the terminal device participating in federated learning can make full use of its own data processing capability, data resources and data transmission resources, so as to cause the multiple terminal devices participating in federated learning to complete the task of model training as soon as possible, thereby improving efficiency of federated learning. In the implementation of the present solution, factors that influence the efficiency of federated learning at least include: factors of data processing capability of the terminal device and the data transmission capability of the terminal device. As can be known that, the network device can improve efficiency of federated learning according to the data processing capabilities of the respective terminal devices participating in federated learning and the data transmission capabilities of the respective terminal devices.

In the following, how the network device schedules the training parameter of the terminal device participating in federated learning will be described in detail with reference to several specific embodiments.

Figure 4:
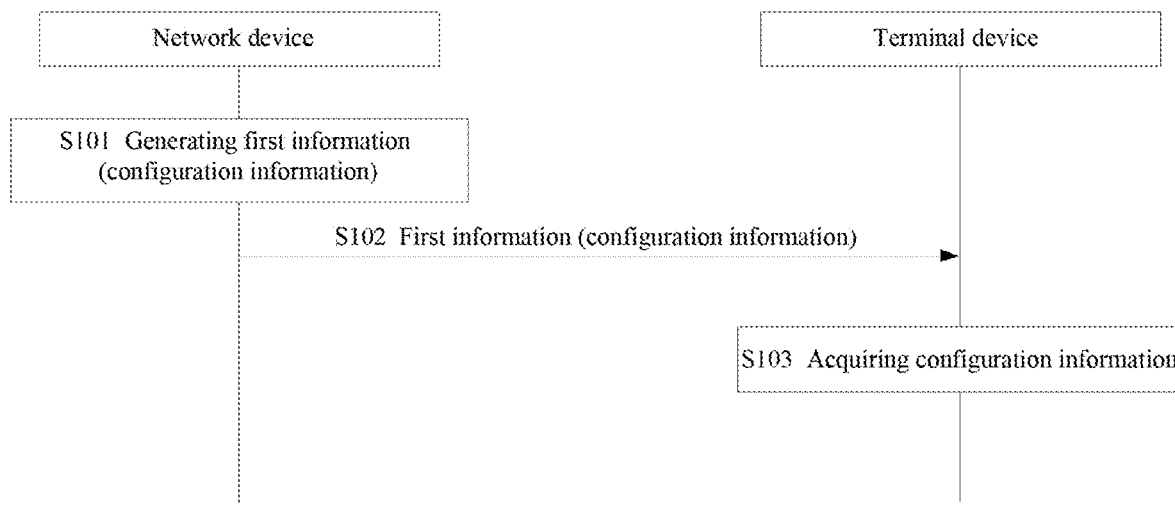
FIG. 4 is a flowchart of a resource scheduling method provided by an embodiment of the present application.

FIG. 4 is a flowchart of a resource scheduling method provided by an embodiment of the present application. As shown in FIG. 4, the method of the present embodiment includes:

S101, a network device generates first information.

In the present solution, in a process of federated learning, as a terminal device needs to upload a training result obtained in a previous training period within each training period, and needs to execute a task of model training in a current training period, when there are multiple terminal devices participating in federated learning, large global time delay of the current round of federated learning may be caused due to low data processing capability and/or low data transmission capability of a certain terminal device. Therefore, the network device may determine whether the terminal device participates in the current round of federated learning according to a current data transmission capability and/or data processing capability of the terminal device participating in federated learning.

It needs to be noted that, in the present solution, specific implementations of whether to determine whether the terminal device participates in the current round of federated learning according to the data processing capability of the terminal device, or according to the data transmission capability of the terminal device, or according to both the data processing capability and the data transmission capability of the terminal device, and how to determine whether the terminal device participates in the current round of federated learning according to the data processing capability and/or the data transmission capability are not limited.

When determining that the terminal device participates in the current round of federated learning, the network device generates the first information, where the first information may include configuration information of the training parameter for the terminal device to perform model training, and the training parameter may be a parameter of sample data and/or a parameter of a model to be trained; that is, the configuration information is used to indicate characteristics of the sample data and/or characteristics of the model to be trained for the terminal device to perform model training.

In a possible implementation, the configuration information may include any one or any combination of indication information of a type of the sample data, indication information of an amount of the sample data, indication information of a data packet to which the sample data belongs.

Illustratively, the indication information of the type of the sample data may be an index corresponding to the type of the sample data, or a name corresponding to the type of the sample data, etc. After being classified and labeled, the sample data collected by the terminal device may constitute sample data sets of various types, for example, human face images collected by the terminal device may constitute a sample data set, and the type of this sample data set is human face, and the index corresponding to this type is, for example, 0; animal images collected by the terminal device may constitute another sample data set, and the type of this sample data set is animal, and the index corresponding to this type is, for example, 1; if the model to which federated learning is performed is to be applied in human face recognition, and then the configuration information may include the name of the type of "human face", or may also include the index 0 corresponding to the type of "human face". Certainly, in practical applications, there may be more types of sample data, and it is not limited to those described in the example.

Illustratively, the indication information of the amount of the sample data is used to indicate the amount of the sample data adopted by the terminal device to perform the current round of federated learning, and the amount of the sample data here may be the number of images, frames of videos, time of audios, etc. In practical applications, the indication information of the amount of the sample data may specifically be a number.

It needs to be noted that, the amount of sample data has an associating relationship with the data processing capability of the terminal device, and the data processing capability here represents a rate at which the terminal device processes the sample data. The higher the data processing rate of the terminal device is, the more the amount of the sample data for the terminal device to perform model training may be, and the lower the data processing rate of the terminal device is, the less the amount of the sample data for the terminal device to perform model training may be. Therefore, the network schedules the amount of the sample data used in the model training by the terminal device, so that the data processing capability of the terminal device is fully used.

Illustratively, the indication information of the data packet to which the sample data belongs may be an identifier of the data packet to which the sample data belongs, and the identifier may be, for example, an index of the data packet. Specifically, after having collected the sample data, the terminal device may divide the sample data to constitute one or more sample data sets, and each sample data set can be referred to as a data packet, and the terminal device can configure one or more identifiers for these data packets in advance. When being divided by the terminal device, the sample data may be divided according to a certain type, or, may be divided according to a certain time period, or, may be divided according to other rules, which is not limited by the embodiment of the present application.

In another possible implementation, the configuration information may include an identifier of the model to be trained. The identifier of the model to be trained may be an index corresponding to the model to be trained, or, may also be a name corresponding to the model to be trained, and specific implementations of the identifier of the model to be trained is not limited in the present solution, as long as the model to be trained can be uniquely identified. When the configuration information only includes the identifier of the model to be trained, the terminal device can determine other training parameters according to a preset rule, and the preset rule may be that, for example, training parameters of the current training period, which are not indicated by the network device, may be determined according to the training parameters used in the previous training period. Certainly, the preset rule may be other rules, which is not limited by the embodiment of the present application.

In another possible implementation, the configuration information may include any one or any combination of indication information of a type of the sample data, indication information of an amount of the sample data, indication information of a data packet to which the sample data belongs, and the identifier of the model to be trained.

It needs to be noted that, when there are multiple terminal devices participating in the current round of federated learning, the network device sends the first information to the multiple terminal devices respectively. As the current data transmission capabilities and/or the data processing capabilities of the terminal devices participating in federated learning may be same, or may be different, therefore the configuration information included in the first information generated by the network device for the multiple terminal devices respectively may be same, or may be different, which is not limited by the embodiment of the present application.

S102, the network device sends the first information to the terminal device.

S103, the terminal device acquires the configuration information.

The network device sends the first information to the terminal device, and correspondingly, the terminal device receives the first information sent by the network device. In an embodiment, the network device may send the first information to the terminal device through downlink control information (DCI), or a downlink media access control layer control element (MAC CE) signaling, or a higher-layer configuration signaling, or control information of an application layer. And then, the terminal device parses the first information to acquire the configuration information included therein.

When there are multiple terminal devices participating in the current round of federated learning, the network device sends the first information to the multiple terminal devices respectively. The first information sent by the network device to each of the terminal device may also be included in the DCI, or the MAC CE signaling, or the higher-layer configuration signaling, or the control information of the application layer.

Illustratively, the network device may transmit the first information to a certain terminal device through a unicast control channel (such as DCI) or a user-specific higher-layer configuration signaling (such as RRC signaling), to schedule a training parameter for the terminal device; or the network device may also transmit the first information to a group of terminal devices through a group common control channel (such as group-common DCI) or broadcast information (such as system information), to schedule the training parameters for the group of terminal devices. RRC (Radio Resource Control) represents radio resource control.

In the present embodiment, the network device first generates first information, the first information including configuration information of the training parameter for the terminal device to perform model training, and specifically, the configuration information is used to indicate characteristics of sample data, and/or, characteristics of a model to be trained for the terminal device to perform model training; and then, the network device sends the first information to the terminal device, and the terminal device acquires the configuration information included in the first information. In the present embodiment, the network device determines, according to a data processing capability and/or a data transmission capability of the terminal device, that the terminal device participates in a current round of federated learning, and generates and sends the configuration information of the training parameter that matches the terminal device, thereby realizing scheduling of the training parameter in a wireless network.

Figure 5:
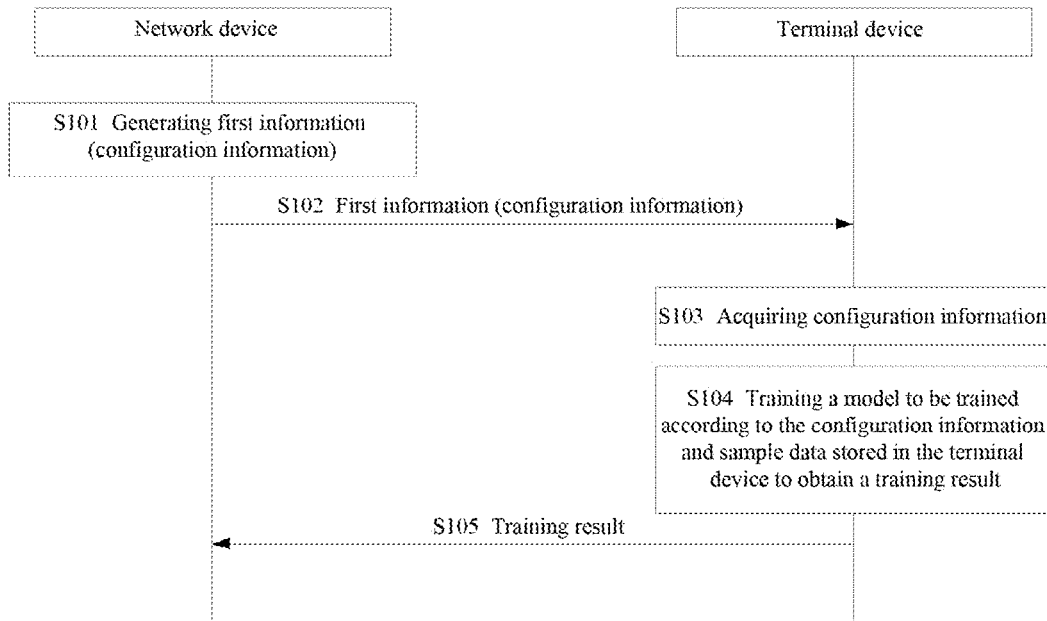
FIG. 5 is a flowchart of a resource scheduling method provided by another embodiment of the present application.

FIG. 5 is a flowchart of a resource scheduling method provided by another embodiment of the present application. As shown in FIG. 5, on the basis of the embodiment shown in FIG. 4, the method of the present embodiment further includes:

S104, the terminal device trains the model to be trained according to the configuration information and sample data stored in the terminal device, to obtain a training result.

In this step, the terminal device determines the sample data used for model training from the data stored in the terminal device according to the configuration information, and inputs the determined sample data into the model to be trained for learning, so as to obtain the training result.

In the present solution, the configuration information generated by the network device is determined according to the data processing capability of the terminal device, therefore, performing the model training by the terminal device based on the configuration information can ensure that the terminal device completes the current round of learning within the training period, and time delay of the current round of federated learning will not be caused, so as to ensure the efficiency of federated learning.

In an embodiment, in some embodiments, the method further includes:

S105, the terminal device sends the training result to the network device.

Specifically, the terminal device can send the training result to the network device in a next training period. For example, the terminal device has participated in the first round of federated learning and the second round of federated learning, and the first round of federated learning and the second round of federated learning correspond to the first training period and the second training period respectively, and the time duration of the first training period and the time duration of the second training period are the same, and the terminal device can send the training result obtained in the first training period to the network device in the second training period.

It needs to be noted that, the training period in the present solution refers to that the terminal is able to complete the model training within the training period, and is able to completely send the training result of the previous training period to the network device.

Figure 6:
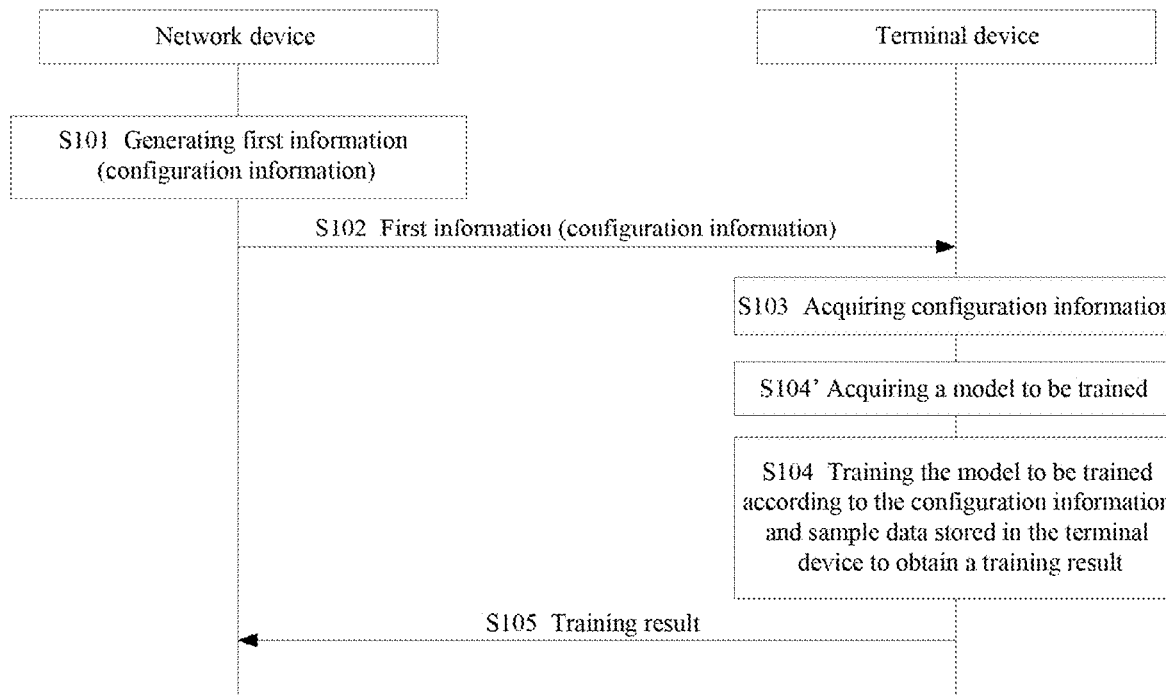
FIG. 6 is a flowchart of a resource scheduling method provided by another embodiment of the present application.

FIG. 6 is a flowchart of a resource scheduling method provided by another embodiment of the present application. As shown in FIG. 6, on the basis of the embodiment shown in FIG. 5, before S104 in which the terminal device trains the model to be trained according to the configuration information and the sample data stored in the terminal device, to obtain the training result, the method of the present embodiment further includes:

S104', the terminal device acquires the model to be trained.

In the present solution, the terminal device acquires the model to be trained from the network device, which can be implemented by any one of the following ways.

Figure 7:
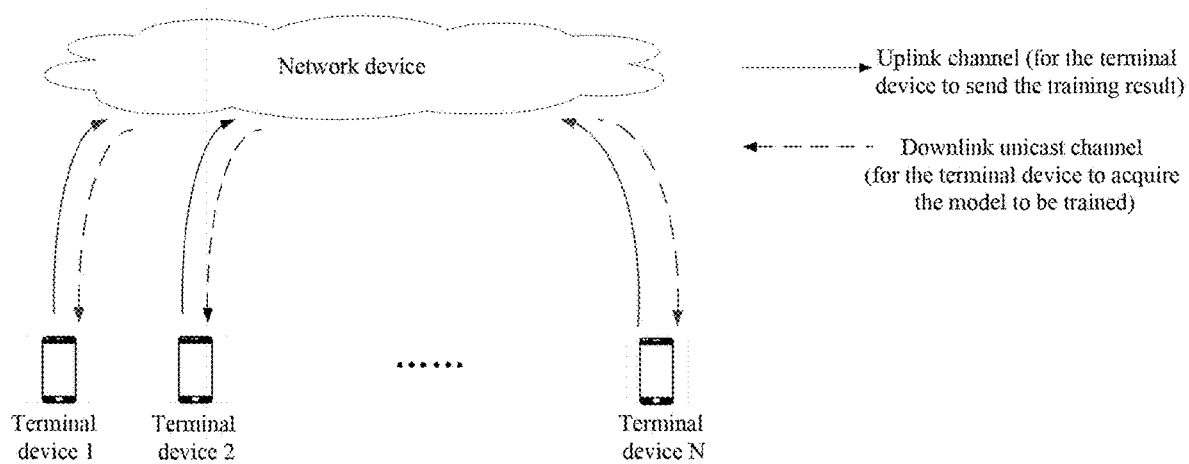
FIG. 7 is a first schematic diagram of a communication system for assigning models to be trained provided by the present application.

The first possible implementation:

as shown in FIG. 7, the network device sends multiple models to the terminal device through a broadcast channel or a multicast channel, and correspondingly, the terminal device receives the multiple models, where the multiple models include the model to be trained which needs to be used in the current round of federated learning. Then, the terminal device determines the model to be trained from the multiple models according to the identifier of the model to be trained included in the configuration information.

In an embodiment, the configuration information can be sent by the network device through a unicast channel or a group common channel.

Figure 8:
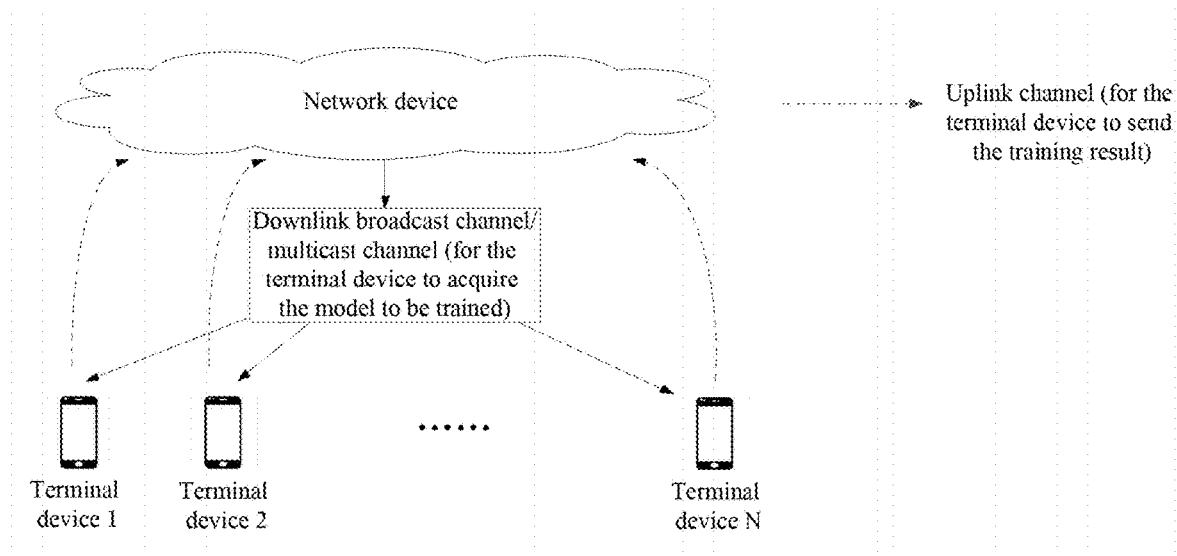
FIG. 8 is a second schematic diagram of a communication system for assigning models to be trained provided by the present application.

The second possible implementation:

as shown in FIG. 8, the network device sends multiple models to the terminal device through a unicast channel or a group common channel, where the multiple models include the model to be trained which needs to be used in the current round of federated learning; and then, when receiving second information sent by the network device through the unicast channel or the group common channel, the terminal device downloads, according to the second information, the model corresponding to the identifier of the model to be trained included in the configuration information from the unicast channel or the group common channel.

In an embodiment, the second information may include an identifier of the terminal device or a group identifier of the terminal device. The identifier of the terminal device may be a radio network temporary identity (RNTI); the group identifier of the terminal device may be a group RNTI of a terminal device group to which the terminal device belongs.

In practical communication systems, the network device sends the second information to the terminal device, and may scramble downlink control information carried in a physical downlink control channel (PDCCH) through the RNTI or the group RNTI, and the terminal device descrambles the received downlink control information through the RNTI or the group RNTI, and if the descrambling succeeds, the terminal device determines that the network device indicates the terminal device to download the model to be trained from the unicast channel or the group common channel, and then, the terminal device downloads the model corresponding to the identifier of the model to be trained from the unicast channel or the group common channel according to the identifier of the model to be trained included in the configuration information; and if the descrambling fails, the terminal device does not need to perform any processing.

The third possible implementation:

as shown in FIG. 7, the network device sends multiple models to the terminal device through a broadcast channel or a multicast channel, and correspondingly, the terminal device receives the multiple models, where the multiple models include the model to be trained which needs to be used in the current round of federated learning. And then, the terminal device determines the model to be trained from the multiple models according to indication information of a preset position; the indication information of the preset position referred herein is used to indicate a position of the model to be trained in the multiple models, and illustratively, the position of the model to be trained in the multiple models may be an order of the model to be trained in the multiple models.

The indication information of the preset position may be negotiated by the network device and the terminal device in advance.

The fourth possible implementation:

as shown in FIG. 8, the network device sends multiple models to the terminal device through a unicast channel or a group common channel, where the multiple models include the model to be trained which needs to be used in the current round of federated learning. And then, the terminal device downloads the model to be trained from the multiple models according to indication information of a preset position; the indication information of the preset position referred herein is used to indicate a position of the model to be trained in the multiple models, and illustratively, the position of the model to be trained in the multiple models may be an order of the model to be trained in the multiple models or a time interval to acquire the model to be trained.

The indication information of the preset position may be negotiated by the network device and the terminal device in advance.

In the third possible implementation and the fourth possible implementation, the network device and the terminal device may negotiate position information of the model to be trained in the multiple models, therefore, when the terminal device acquires the model to be trained, the network device does not need to send indication information to the terminal device, so that times of interactions between the network device and the terminal device are reduced, and signaling overhead is reduced, thus improving efficiency of federated learning.

In addition, it further needs to be noted that, when there are more terminal devices in the coverage cell of the network device participating in the current round of federated learning, the network device may issue the model to be trained to the terminal devices through the broadcast channel or the multicast channel according to the means shown in FIG. 7; when there are only several terminal devices in the coverage cell of the network device participating in the current round of federated learning, the network device may issue the model to be trained through the unicast channel or the group common channel according the means shown in FIG. 8. The downlink spectrum efficiency is improved by rationally using downlink spectrum resources.

In addition, it further needs to be noted that, no matter through which one of the above possible implementations the terminal device acquires the model to be trained, after executing the model training, the terminal device may send the training result to the network device through the unicast channel or the group common channel (group-common).

In some other embodiments, the terminal device may participate in multiple rounds of federated learning continuously, then in the process of S105 where the terminal device sends the training result to the network device, a next round of federated learning may be executed simultaneously, where the process of executing the next round of federated learning is similar to S101-S104.

Based on the technical solution in the above embodiments, several specific implementations that the network device performs resource scheduling will be described in the following by taking an example where the configuration information includes different parameters.

Figure 9:
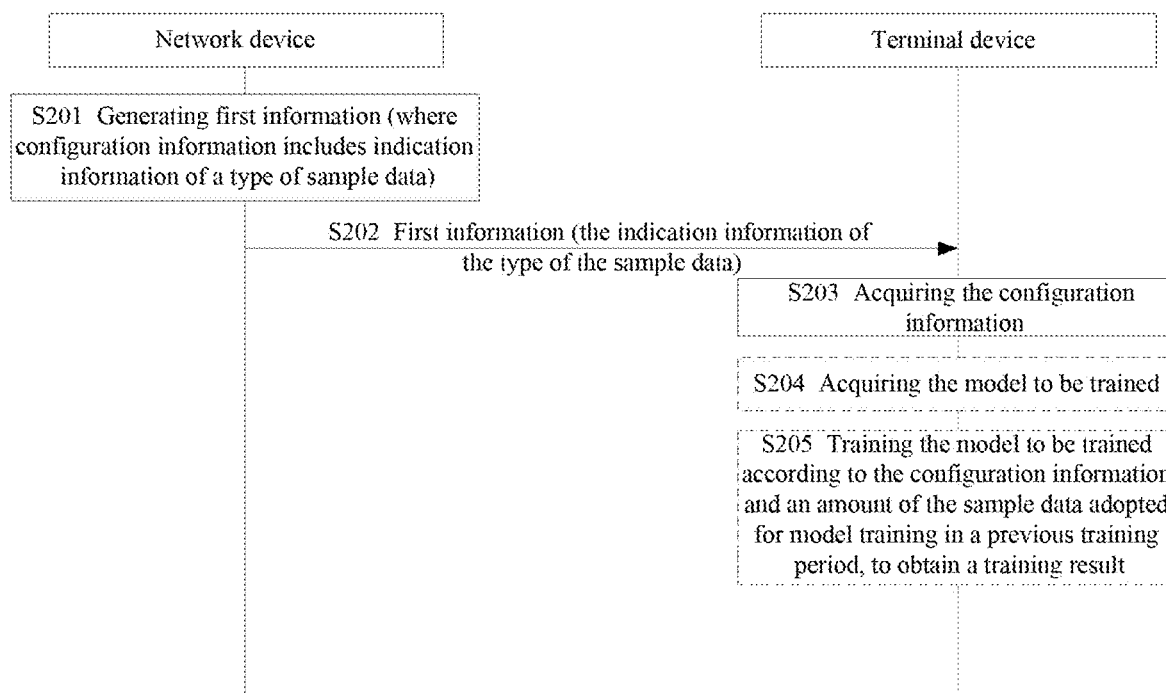
FIG. 9 is a flowchart of a resource scheduling method provided by another embodiment of the present application.

FIG. 9 is a flowchart of a resource scheduling method provided by another embodiment of the present application. As shown in FIG. 9, the method of the present embodiment includes:

S201, a network device generates first information.

In the present embodiment, the step S201 is similar to S101 in the embodiment shown in FIG. 4, and reference can be made to the detailed description of the embodiment shown in FIG. 4, which will not be repeated here. A difference between the present step and S101 is that, in the present embodiment, the first information includes configuration information of a training parameter for a terminal device to perform model training, where the configuration information includes indication information of a type of sample data.

S202, the network device sends the first information to the terminal device.

In the present embodiment, the step S202 is similar to S102 in the embodiment shown in FIG. 4, and reference can be made to the detailed description of the embodiment shown in FIG. 4, which will not be repeated here.

S203, the terminal device acquires the configuration information.

In the present embodiment, the step S203 is similar to S103 in the embodiment shown in FIG. 4, and reference can be made to the detailed description of the embodiment shown in FIG. 4, which will not be repeated here. A difference between the present step and S103 is that, in the present embodiment, the configuration acquired by the terminal device from the first information includes the indication information of the type of the sample data.

In the present embodiment, the network device first generates first information, the first information including configuration information of the training parameter for the terminal device to perform model training, and specifically, the configuration information is used to indicate characteristics of sample data, and/or, characteristics of a model to be trained for the terminal device to perform model training; and then, the network device sends the first information to the terminal device, and the terminal device acquires the configuration information included in the first information. In the present embodiment, the network device determines, according to a data processing capability and/or a data transmission capability of the terminal device, that the terminal device participates in a current round of federated learning, and generates and sends the configuration information of the training parameter that matches the terminal device, thereby realizing scheduling of the training parameters in a wireless network.

In some embodiments, the method further includes:

S204, the terminal device acquires the model to be trained.

For the implementation of acquiring the model to be trained by the terminal device, reference can be made to the detailed description in the embodiment shown in FIG. 6, which will not be repeated here.

S205, the terminal device trains the model to be trained according to the configuration information and an amount of sample data adopted for model training in the previous training period, to obtain a training result.

Specifically, the terminal device acquires sample data corresponding to the type from the data stored in the terminal device according to the type indicated by the configuration information; if the network device does not indicate the amount of the sample data to be used in the current round of federated learning in the configuration information, the terminal device may determine the amount of the sample data of the current round of federated learning according to the amount of the sample data adopted for model training in the previous training period.

In the present embodiment, the network device does not need to configure the training parameter (i.e. the amount of the sample data) in the first information, so that the signaling overhead of the first information can be reduced.

Figure 10:
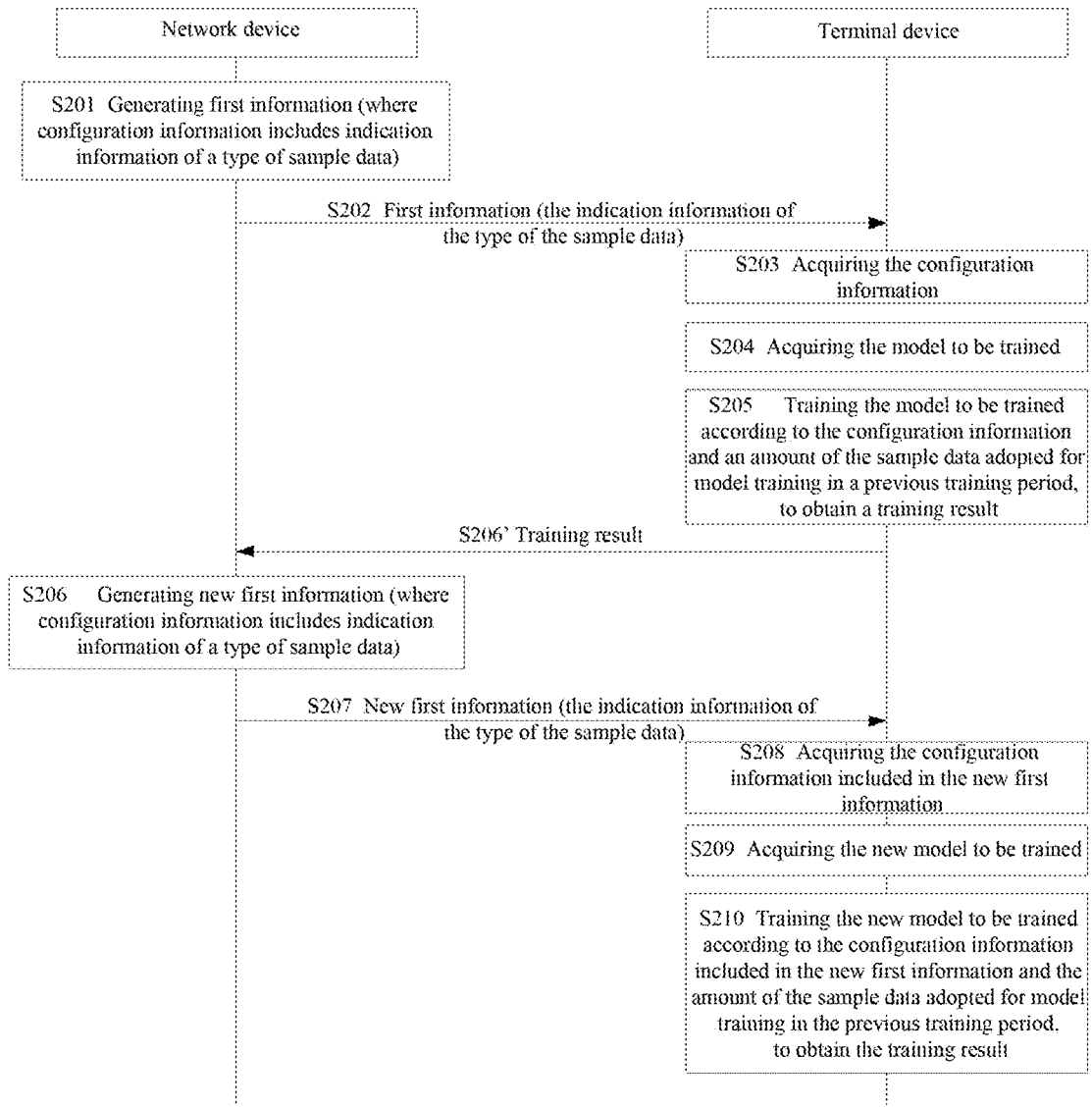
FIG. 10 is a flowchart of a resource scheduling method provided by another embodiment of the present application.

FIG. 10 is a flowchart of a resource scheduling method provided by another embodiment of the present application. As shown in FIG. 10, on the basis of the embodiment shown in FIG. 9, the method of the present embodiment further includes:

S206, a network device generates new first information.

In practical applications, the terminal device may participate in multiple rounds of federated learning, therefore, the network device may generate the new first information according to a new round of federated learning. The new first information referred to herein includes the configuration information of the training parameter to be used by the terminal device in the new round of federated learning process. For example, the first information in S201 includes the configuration information of the training parameter to be used by the terminal device in the N-th round of federated learning process, and the first information in S206 includes the configuration information of the training parameter to be used by the terminal device in the (N+1)-th round of federated learning process. N is a positive integer.

If the indication information of the type of the sample data included in the first information in S206 is different from the indication information of the type of the sample data included in S201, that is, at this time, the network device indicates the terminal device to switch the type of the sample data for model training.

It needs to be noted that, if there are multiple terminal devices participating in the new round of federated learning, the network device may generate the new information for part or all of the multiple the terminal devices respectively. The indication information of the types of the sample data included in the first information corresponding to different terminal devices may be the same, or may be different.

S207, the network device sends the new first information to the terminal device.

Correspondingly, the terminal device receives the first information sent by the network device.

In an embodiment, the new first information may be included in downlink control information (DCI), or a downlink media access control layer control element (MAC CE) signaling, or a higher-layer configuration signaling, or control information of an application layer sent by the network device. And then, the terminal device parses the received new first information to acquire the configuration information included in the new first information.

When there are multiple terminal devices participating in the current round of federated learning, the network device sends the first information to the multiple terminal devices respectively. The first information sent by the network device to each of the terminal devices may also be included in the DCI, or the MAC CE signaling, or the higher-layer configuration signaling, or the control information of the application layer.

S208, the terminal device acquires the configuration information included in the new first information.

Specifically, the terminal device parses the new first information generated by the network device in S206, to acquire the configuration information included in the new first information.

S209, the terminal device acquires a new model to be trained.

For the implementation of acquiring the new model to be trained by the terminal device, reference can be made to the detailed description in the embodiment shown in FIG. 6, which will not be repeated here.

In addition, the new model to be trained in this step is obtained by performing federated averaging processing by the network device according to training results of at least one terminal device in historical training periods. The federated averaging processing referred to herein represents fusing processing to the result of the at least one terminal device in a certain round of federated learning. Specifically, the federated averaging processing may be to average gradients reported by the multiple terminal devices to obtain an average gradient, and to export a modification to weights of the model based on the average gradient.

S210, the terminal device trains the new model to be trained according to the configuration information included in the new first information and an amount of the sample data adopted for model training in the previous training period, to obtain a training result.

Specifically, the terminal device determines the type of the sample data adopted by the terminal device to perform the current round of federated learning according to the configuration information included in the new first information, and determines the amount of the sample data adopted by the terminal device to perform the current round of federated learning according to the amount of the sample data used in the model training in the previous training period, and determines the sample data from the data stored in the terminal device according to the type of the sample data and the amount of the sample data to be used by the terminal device in the current round of federated learning, and trains the model to be trained, to obtain the training result of the current round of federated learning.

In the embodiment shown in FIG. 10, in the process of performing S206-S210, the method may further include:

S206', the terminal device sends the training result to the network device.

The training result referred to in this step is the training result obtained in step 205 of the present embodiment.

It needs to be noted that, if determining that the terminal device can participate in the next round of federated learning, the network device may generate the new first information for the terminal device after S210, and the subsequent processes are similar to S206-S210 in the present embodiment, which will not be repeated here.

On the basis of the embodiment shown in FIG. 9 and FIG. 10, if the network device determines that the terminal device participates in the new round of federated learning, and the amount of the sample data and the type of the sample data adopted by the terminal device when participating in the new round of federated learning are same as the amount of the sample data and the type of the sample data adopted in the previous round of federated learning, the network device may not generate the new information for the new round of federated learning, and when receiving the model to be trained in the new round of federated learning, the terminal device determines the type of the sample data and the amount of the sample data to be used in the current round of federated learning according to the amount of the sample data and the type of the sample data adopted in the previous round of federated learning, and then determines the sample data to be used in the model training from the data stored in the terminal device, and inputs such sample data into the model to be trained, to obtain the training result.

In the present solution, if the terminal device does not receive new indication information of the type of the sample data, the terminal device adopts the type of the sample data indicated by the latest configuration information to perform model training within the following one or more training periods.

As can be known from the embodiment shown in FIG. 9 and FIG. 10, in the present solution, the sample data of a fixed type can be adopted statically, or the terminal device can be indicated to switch the type of the sample data semi-statically and dynamically, so that the type of the sample data adopted for model training can be flexibly adjusted according to the training task; if the ML model is centrally optimized in a certain aspect, better training effect can be realized; in addition, according to different characteristics of sample data collected from the terminal, different types of sample data are selected for different terminal devices to perform model training, so that the ML model with broader representativeness can be obtained.

Figure 11:
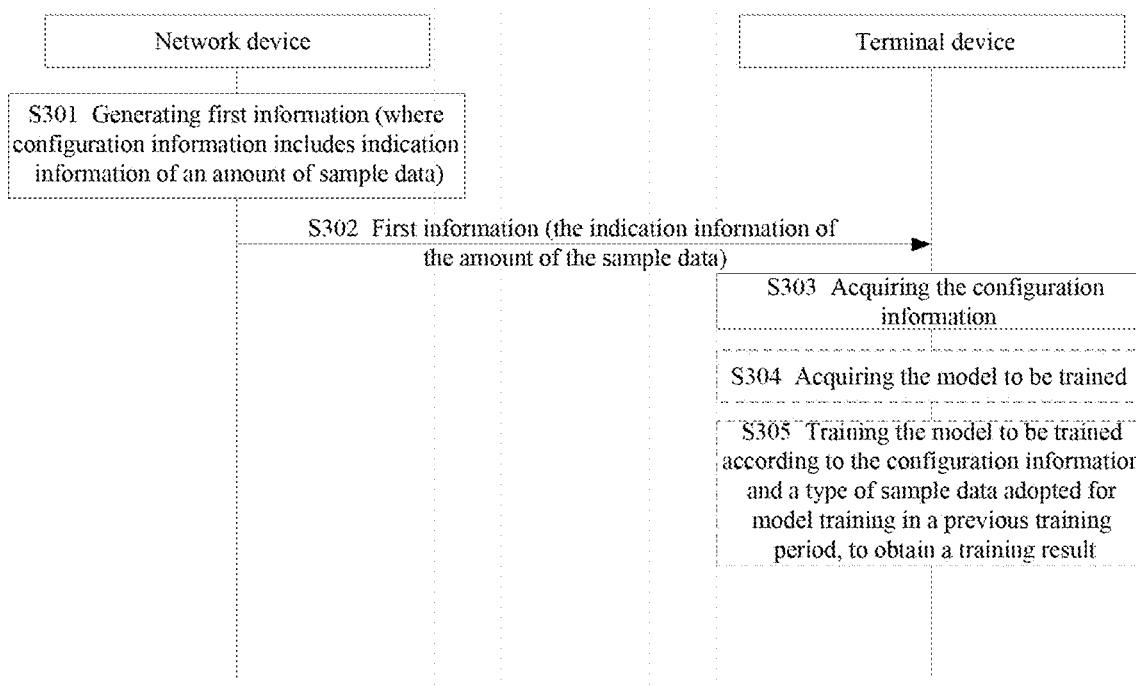
FIG. 11 is a flowchart of a resource scheduling method provided by another embodiment of the present application.

FIG. 11 is a flowchart of a resource scheduling method provided by another embodiment of the present application. As shown in FIG. 11, the method of the present embodiment includes:

S301, a network device generates first information.

In the present embodiment, the step S301 is similar to S101 in the embodiment shown in FIG. 4, and reference can be made to the detailed description of the embodiment shown in FIG. 4, which will not be repeated here. A difference between the present step and S101 is that, in the present embodiment, the first information includes configuration information of a training parameter for a terminal device to perform model training, where the configuration information includes indication information of an amount of sample data.

S302, the network device sends the first information to the terminal device.

In the present embodiment, the step S302 is similar to S102 in the embodiment shown in FIG. 4, and reference can be made to the detailed description of the embodiment shown in FIG. 4, which will not be repeated here.

S303, the terminal device acquires the configuration information.

In the present embodiment, the step S303 is similar to S103 in the embodiment shown in FIG. 4, and reference can be made to the detailed description of the embodiment shown in FIG. 4, which will not be repeated here. A difference between the present step and S103 is that, in the present embodiment, the configuration acquired by the terminal device from the first information includes the indication information of the amount of the sample data.

In the present embodiment, the network device first generates first information, the first information including configuration information of the training parameter for the terminal device to perform model training, and specifically, the configuration information is used to indicate characteristics of sample data, and/or, characteristics of a model to be trained for the terminal device to perform model training; and then, the network device sends the first information to the terminal device, and the terminal device acquires the configuration information included in the first information. In the present embodiment, the network device determines, according to a data processing capability and/or a data transmission capability of the terminal device, that the terminal device participates in a current round of federated learning, and generates and sends the configuration information of the training parameter that matches the terminal device, thereby realizing scheduling of the training parameter in a wireless network.

S304, the terminal device acquires the model to be trained.

For the implementation of acquiring the model to be trained by the terminal device, reference can be made to the detailed description in the embodiment shown in FIG. 6, which will not be repeated here.

S305, the terminal device trains the model to be trained according to the configuration information and a type of sample data adopted for model training in a previous training period, to obtain a training result.

Specifically if the network device does not indicate the type of the sample data to be used in the current round of federated learning in the configuration information, the terminal device may determine the type of the sample data of the current round of federated learning according to the type of the sample data adopted for model training in the previous training period.

In the present embodiment, the network device does not need to configure the training parameter (i.e. the type of the sample data) in the first information, so that the signaling overhead of the first information can be reduced.

Figure 12:
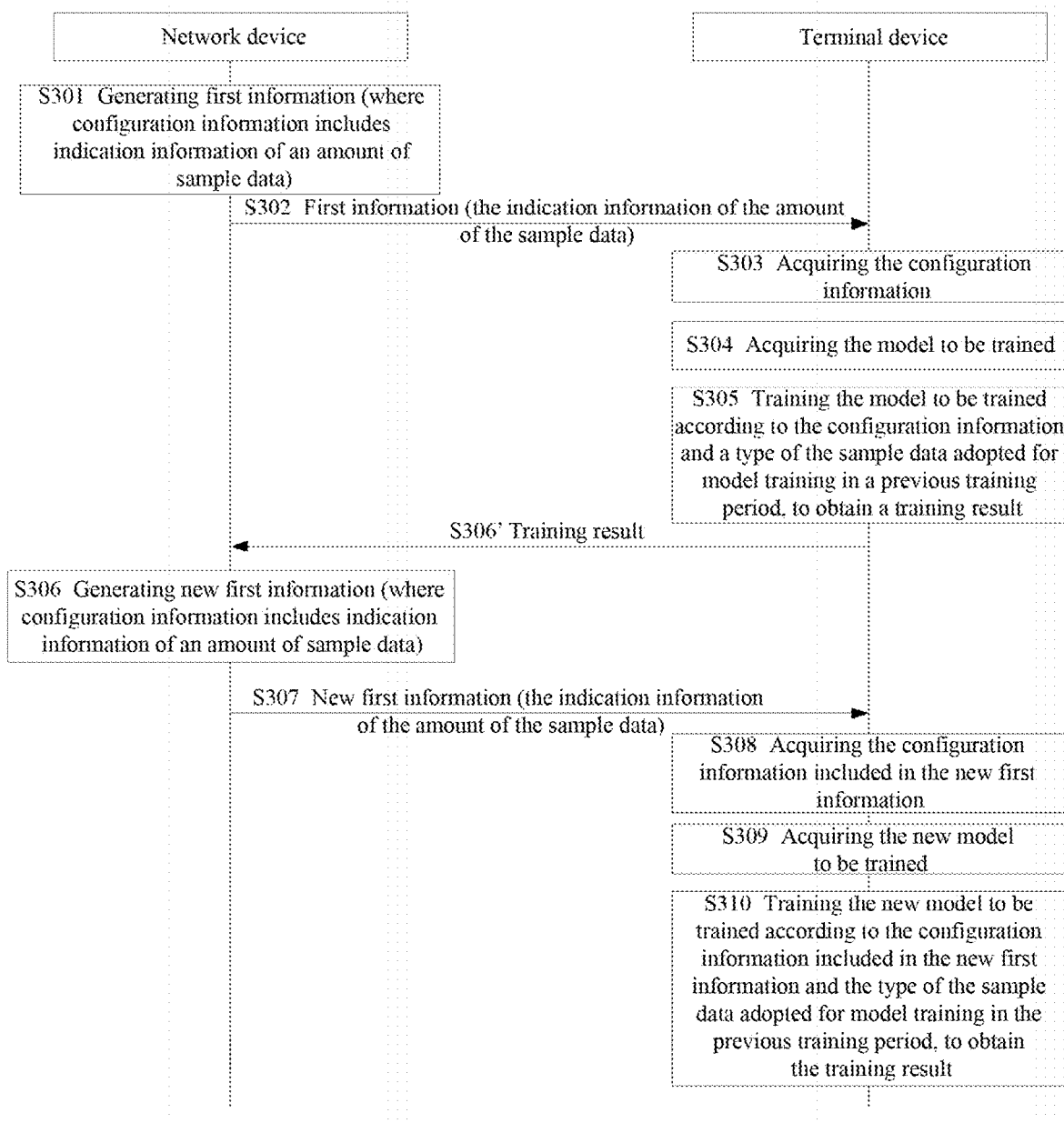
FIG. 12 is a flowchart of a resource scheduling method provided by another embodiment of the present application.

FIG. 12 is a flowchart of a resource scheduling method provided by another embodiment of the present application. As shown in FIG. 12, on the basis of the embodiment shown in FIG. 11, the method of the present embodiment further includes:

S306, a network device generates new first information.

In practical applications, the terminal device may participate in multiple rounds of federated learning, therefore, the network device may generate the new first information according to a new round of federated learning. The new first information referred to herein includes the configuration information of the training parameter to be used by the terminal device in the new round of federated learning process. For example, the first information in S301 includes the configuration information of the training parameter to be used by the terminal device in the N-th round of federated learning process, and the first information in S306 includes the configuration information of the training parameter to be used by the terminal device in the (N+1)-th round of federated learning process. N is a positive integer.

If the indication information of the amount of the sample data included in the first information in S306 is different from the indication information of the amount of the sample data included in S301, that is, at this time, the network device indicates the terminal device to switch the amount of the sample data for model training.

It needs to be noted that, if there are multiple terminal devices participating in the new round of federated learning, the network device may generate the new information for part or all of the multiple the terminal devices respectively. The indication information of the amounts of the sample data included in the first information corresponding to different terminal devices may be the same, or may be different.

S307, the network device sends the new first information to the terminal device.

Correspondingly, the terminal device receives the first information sent by the network device.

In an embodiment, the new first information may be included in downlink control information (DCI), or a downlink media access control layer control element (MAC CE) signaling, or a higher-layer configuration signaling, or control information of an application layer sent by the network device. And then, the terminal device parses the received new first information, to acquire the configuration information included in the new first information.

When there are multiple terminal devices participating in the current round of federated learning, the network device sends the first information to the multiple terminal devices respectively. The first information sent by the network device to the respective terminal devices may also be included in the DCI, or the MAC CE signaling, or the higher-layer configuration signaling, or the control information of the application layer.

S308, the terminal device acquires the configuration information included in the new first information.

Specifically, the terminal device parses the new first information generated by the network device in S306, to acquire the configuration information included in the new first information, that is, to acquire the indication information of the amount of the sample data included in the configuration information.

S309, the terminal device acquires a new model to be trained.

For the implementation of acquiring the new model to be trained by the terminal device, reference can be made to the detailed description in the embodiment shown in FIG. 6, which will not be repeated here.

In addition, the new model to be trained in this step is obtained by performing federated averaging processing by the network device according to training results of at least one terminal device in historical training periods. For related content of federated averaging processing, reference can be made to the description in the embodiment of FIG. 10 in detail, which will not be repeated here.

S310, the terminal device trains the model to be trained according to the configuration information included in the new first information and a type of the sample data adopted for model training in the previous training period, to obtain a training result.

Specifically, the terminal device determines the amount of the sample data adopted by the terminal device to perform the current round of federated learning according to the configuration information included in the new first information, and determines the type of the sample data adopted by the terminal device to perform the current round of federated learning according to the type of the sample data used in the model training in the previous training period, and determines the sample data from the data stored in the terminal device according to the type of the sample data and the amount of the sample data to be used by the terminal device in the current round of federated learning, and inputs the determined sample data into the model to be trained, to obtain the training result of the current round of federated learning.

In the embodiment shown in FIG. 12, in the process of performing S306-S310, the method may further include:

S306', the terminal device sends the training result to the network device.

The training result referred to in this step is the training result obtained in step S305 of the present embodiment.

It needs to be noted that, if determining that the terminal device can participate in the next round of federated learning, the network device may generate the new first information for the terminal device after S310, and the subsequent processes are similar to S306-S310 in the present embodiment, which will not be repeated here.

On the basis of the embodiment shown in FIG. 11 and FIG. 12, if the network device determines that the terminal device participates in the new round of federated learning, and the amount of the sample data and the type of the sample data adopted by the terminal device when participating in the new round of federated learning are same as the amount of the sample data and the type of the sample data adopted in the previous round of federated learning, the network device may not generate the new information for the new round of federated learning, and when receiving the model to be trained in the new round of federated learning, the terminal device determines the type of the sample data and the amount of the sample data to be used in the current round of federated learning according to the amount of the sample data and the type of the sample data adopted in the previous round of federated learning, and then determines the sample data to be used in the model training from the data stored in the terminal device, and inputs such sample data into the model to be trained, to obtain the training result.

In the present solution, if the terminal device does not receive new indication information of the amount of the sample data, the terminal device adopts the amount of the sample data indicated by the latest configuration information to perform model training within the following one or more training periods.

Figure 13:
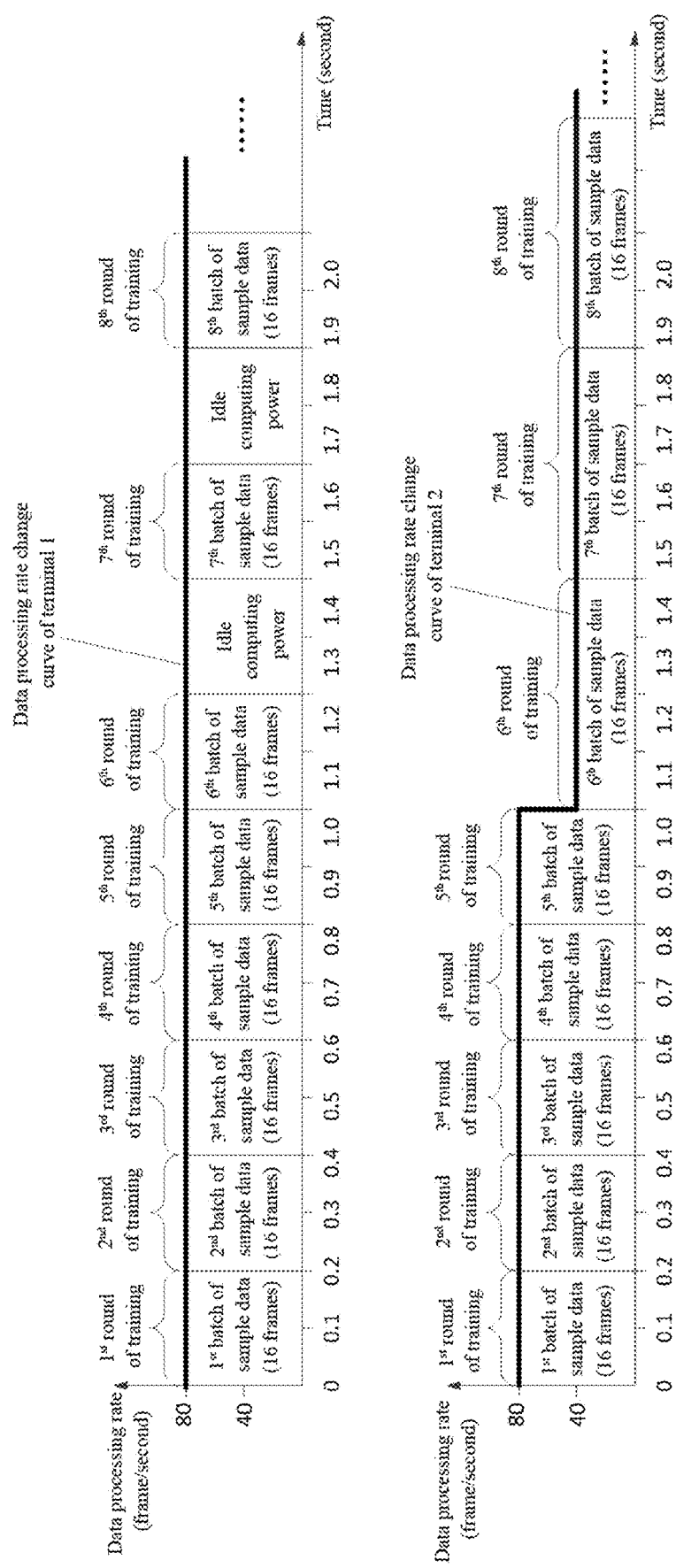
FIG. 13 is a schematic diagram of change of a training period with time when there is no amount-adjusting mechanism for sample data.

In a specific embodiment, the model to be trained is a model used for image processing, and the terminal devices participating in federated learning include: a terminal device 1 and a terminal device 2. With reference to FIG. 13, when the training starts, the data processing rate of both the terminal device 1 and the terminal device 2 is 80 frames/second, and the amount of sample data for each round of federated learning is 16 frames, and within a time of 0-1 second, both of the terminal device 1 and the terminal device 2 can complete a round of federated learning every 0.2 second, and at the first second, the data processing rate of the terminal device 2 is reduced to 40 frames/second, and if the amount of the sample data for each round of federated learning is still 16 frames in the subsequent federated learning, then the time for the terminal device 2 to complete a round of federated learning is extended to 0.4 second. If it is requested in a federated learning strategy that the federated averaging processing starts only after all the terminal devices have submitted the training results, then starting from the first second, the training period for each round of federated learning will be extended from 0.2 second to 0.4 second, and compared with the training speed within 0-1 second, the training speed drops to half of the original speed. As for the terminal device 1, after having completed each round of federated learning, the terminal device 1 can only enter an idle state, and a duration of the idle state is 0.2 second, and it can enter the next round of federated learning only after the terminal device 2 completes the current round of federated learning, which will cause 50% waste of data processing resources of the terminal device 1.

Figure 14:
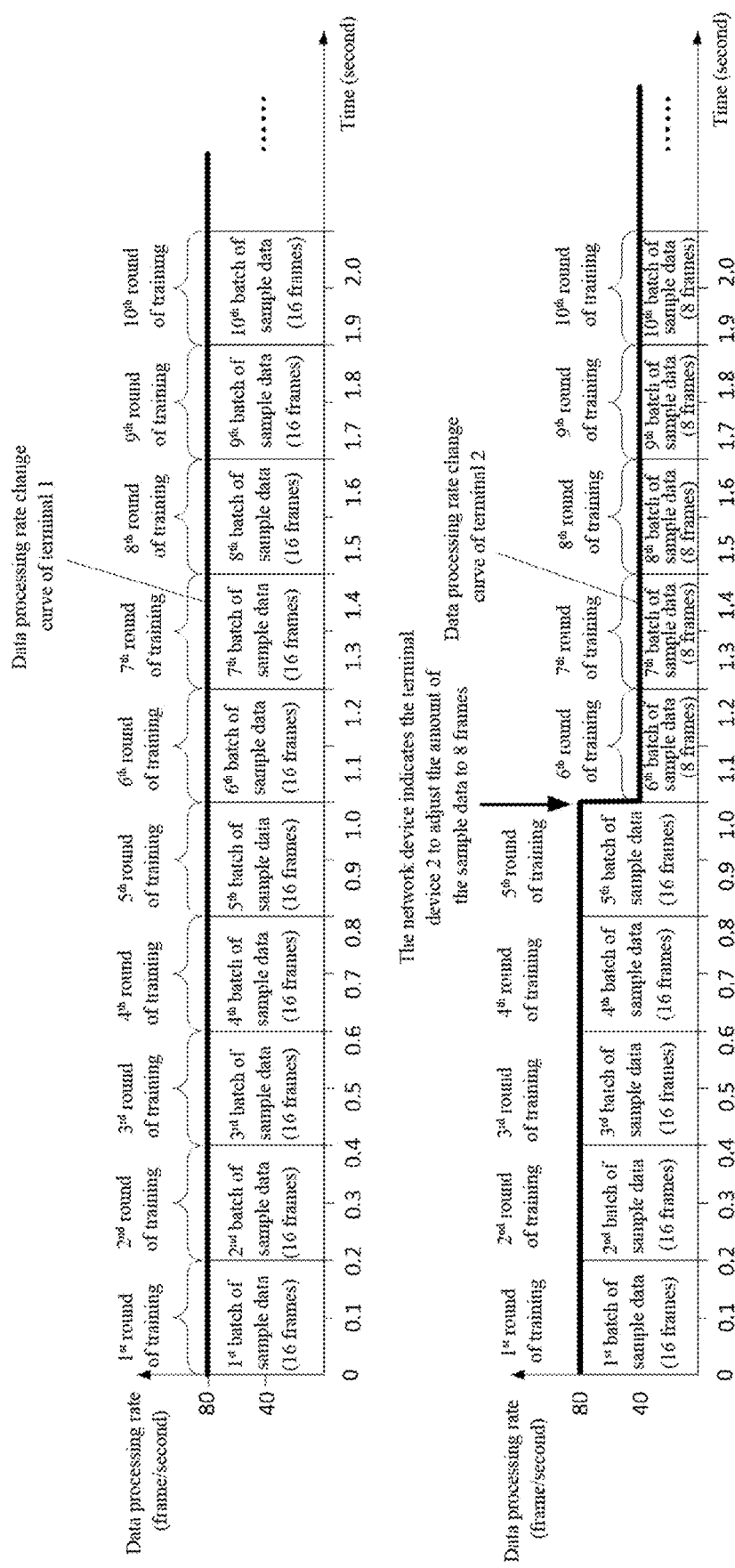
FIG. 14 is a schematic diagram of change of a training period with time when there is an amount-adjusting mechanism for sample data.

By adopting the solution in the embodiment shown by FIG. 11-FIG. 12 of the present application, that is, dynamic adjustment is performed on the amount of training data of each terminal device, as shown in FIG. 14, the amount of the sample data of the terminal device 2 can be adjusted to 8 frames when the data processing rate of the terminal device 2 is reduced to 40 frames/second, and then the time for the terminal device 2 to complete a round of federated learning is 0.2 second, so that the terminal device 1 and the terminal device 2 can complete a round of federated learning at the same time, and the training period of the entire federated learning is still 0.2 second, and the data processing resources of both the terminal device 1 and the terminal device 2 are full used.

Figure 15:
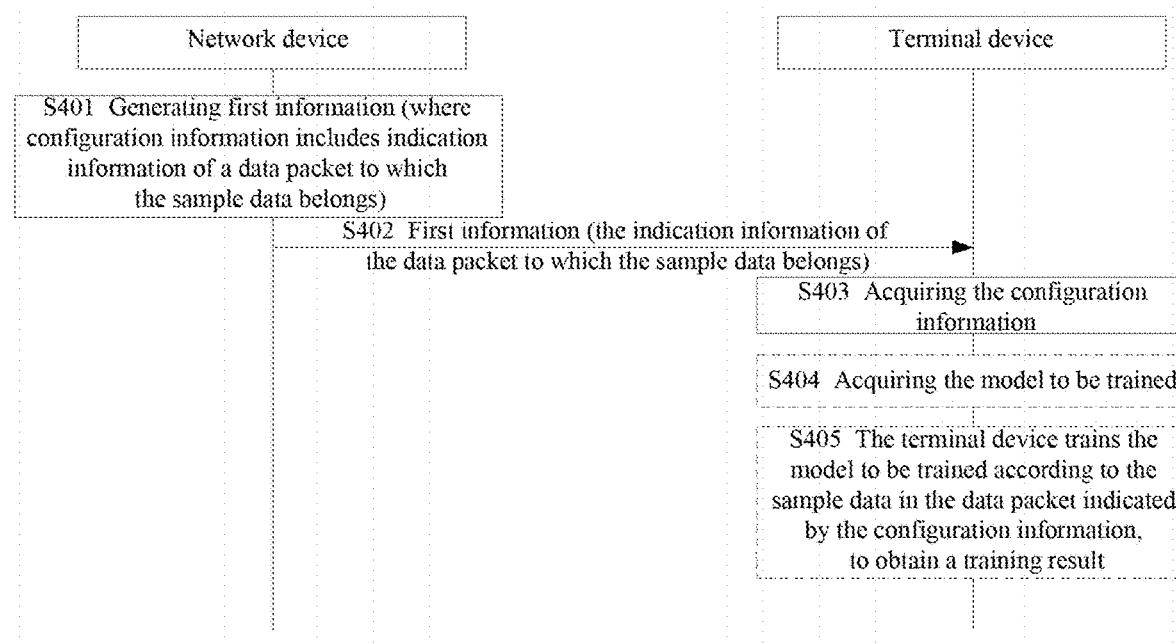
FIG. 15 is a flowchart of a resource scheduling method provided by another embodiment of the present application.

FIG. 15 is a flowchart of a resource scheduling method provided by another embodiment of the present application. As shown in FIG. 15, the method of the present embodiment includes:

S401, a network device generates first information.

In the present embodiment, the step S401 is similar to S101 in the embodiment shown in FIG. 4, and reference can be made to the detailed description of the embodiment shown in FIG. 4, which will not be repeated here. A difference between the present step and S101 is that, in the present embodiment, the first information includes configuration information of a training parameter for a terminal device to perform model training, where the configuration information includes indication information of a data packet to which the sample data belongs.

S402, the network device sends the first information to the terminal device.

In the present embodiment, the step S402 is similar to S102 in the embodiment shown in FIG. 4, and reference can be made to the detailed description of the embodiment shown in FIG. 4, which will not be repeated here.

S403, the terminal device acquires the configuration information.

In the present embodiment, the step S403 is similar to S103 in the embodiment shown in FIG. 4, and reference can be made to the detailed description of the embodiment shown in FIG. 4, which will not be repeated here. A difference between the present step and S103 is that, in the present embodiment, the configuration acquired by the terminal device from the first information includes the indication information of the data packet to which the sample data belongs.

In the present embodiment, the network device first generates first information, the first information including configuration information of a training parameter for the terminal device to perform model training, and specifically, the configuration information is used to indicate characteristics of sample data, and/or, characteristics of a model to be trained for the terminal device to perform model training; and then, the network device sends the first information to the terminal device, and the terminal device acquires the configuration information included in the first information. In the present embodiment, the network device determines, according to a data processing capability and/or a data transmission capability of the terminal device, that the terminal device participates in a current round of federated learning, and generates and sends the configuration information of the training parameter that matches the terminal device, thereby realizing scheduling of the training parameter in a wireless network.

S404, the terminal device acquires the model to be trained.

For the implementation of acquiring the model to be trained by the terminal device, reference can be made to the detailed description in the embodiment shown in FIG. 6, which will not be repeated here.

S405, the terminal device trains the model to be trained according to sample data in the data packet indicated by the configuration information, to obtain a training result.

In the present embodiment, the terminal device takes the data in the data packet indicated by the network device as the sample data to perform model training, and the network device can flexibly schedule data resources of the terminal device according to a training purpose.

Figure 16:
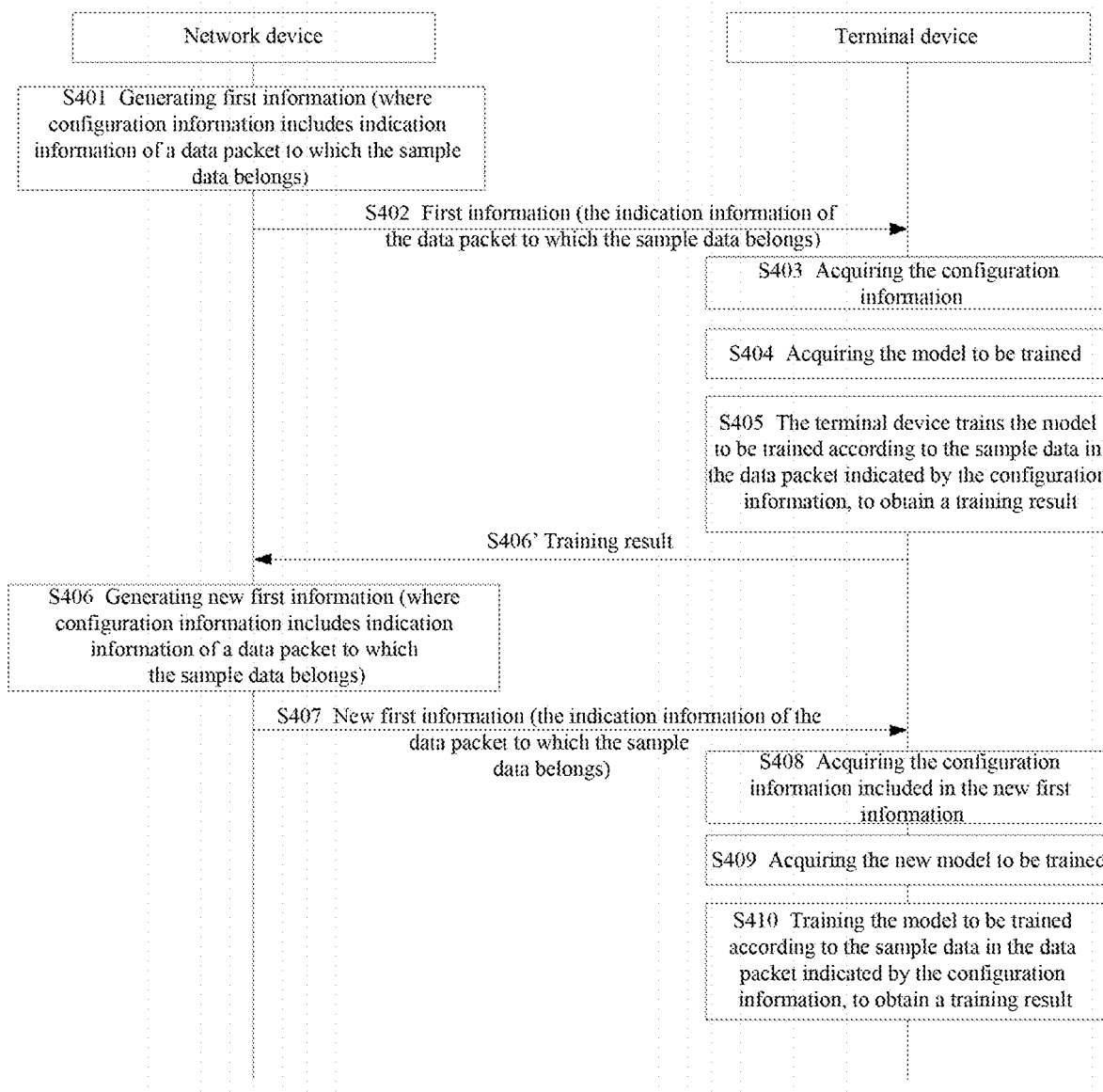
FIG. 16 is a flowchart of a resource scheduling method provided by another embodiment of the present application.

FIG. 16 is a flowchart of a resource scheduling method provided by another embodiment of the present application. As shown in FIG. 16, on the basis of the embodiment shown in FIG. 15, the method of the present embodiment further includes:

S406, a network device generates new first information.

In practical applications, the terminal device may participate in multiple rounds of federated learning, therefore, the network device may generate the new first information according to a new round of federated learning. The new first information referred to herein includes the configuration information of the training parameter to be used by the terminal device in the new round of federated learning process. For example, the first information in S401 includes the configuration information of the training parameter to be used by the terminal device in the N-th round of federated learning process, and the first information in S406 includes the configuration information of the training parameter to be used by the terminal device in the (N+1)-th round of federated learning process. N is a positive integer.

If the indication information of the data packet to which the sample data belongs included in the first information in S406 is different from the indication information of the data packet to which the sample data belongs included in S401, that is, at this time, the network device indicates the terminal device to switch the data packet to which the sample data belongs for model training. If the indication information of the data packet to which the sample data belongs included in the first information in S406 is same as the data packet to which the sample data belongs included in S401, that is, at this time, the network device indicates the terminal device to relearn the sample data in the data packet by adopting a new model to be trained.

It needs to be noted that, if there are multiple terminal devices participating in the new round of federated learning, the network device may generate the new information for part or all of the multiple the terminal devices respectively. The indication information of the data packets to which the sample data belongs included in the first information corresponding to different terminal devices may be the same, or may be different.

S407, the network device sends the new first information to the terminal device.

Correspondingly, the terminal device receives the first information sent by the network device.

In an embodiment, the new first information may be included in downlink control information (DCI), or a downlink media access control layer control element (MAC CE) signaling, or a higher-layer configuration signaling, or control information of an application layer sent by the network device. And then, the terminal device parses the received new first information, to acquire the configuration information included in the new first information.

When there are multiple terminal devices participating in the current round of federated learning, the network device sends the first information to the multiple terminal devices respectively. The first information sent by the network device to each of the terminal devices may also be included in the DCI, or the MAC CE signaling, or the higher-layer configuration signaling, or the control information of the application layer.

S408, the terminal device acquires the configuration information included in the new first information.

Specifically, the terminal device parses the new first information generated by the network device in S406, to acquire the configuration information included in the new first information, that is, to acquire the indication information of the data packet to which the sample data belongs included in the configuration information.

S409, the terminal device acquires a new model to be trained.

For the implementation of acquiring the new model to be trained by the terminal device, reference can be made to the detailed description in the embodiment shown in FIG. 6, which will not be repeated here.

In addition, the new model to be trained in this step is obtained by performing federated averaging processing by the network device according to training results of at least one terminal device in historical training periods. For related content of federated averaging processing, reference can be made to the description in the embodiment of FIG. 10 in detail, which will not be repeated here.

S410, the terminal device trains the new model to be trained according to the sample data in the data packet indicated by the configuration information, to obtain a training result.

Specifically, the terminal device determines the data packet to be adopted by the terminal device to perform the current round of federated learning according to the configuration information included in the new first information, and inputs the sample data in the determined data packet into the new model to be trained, to obtain the training result of the current round of federated learning.

In the embodiment shown in FIG. 16, in the process of performing S406-S410, the method may further include:

S406', the terminal device sends the training result to the network device.

The training result referred to in this step is the training result obtained in step S405 of the present embodiment.

It needs to be noted that, if determining that the terminal device can participate in the next round of federated learning, the network device may further regenerate the new first information for the terminal device after S410, and the subsequent processes are similar to S406-S410 in the present embodiment, which will not be repeated here.

On the basis of the embodiment shown in FIG. 15 and FIG. 16, if the network device determines that the terminal device participates in the new round of federated learning, the network device may not generate the new configuration information for the new round of federated learning, and when receiving the model to be trained which is to be used in the new round of federated learning, the terminal device determines the sample data for model training from the data stored in the terminal device through a means that the network device and the terminal device negotiate in advance, and inputs such sample data into the model to be trained, to obtain the training result.

The means that the network device and the terminal device negotiate in advance to determine the sample data used for model training from the data stored in the terminal device is that, for example, when the network device does not send the new configuration information, the terminal device determines the sample data used for model training from the data stored in the terminal device according to a preset rule, where the preset rule may be, for example, according to a sequence of indexes of the data packets, or, may also be according to a time sequence that the terminal device stores the data, etc.

Illustratively, the network device generates the first information for the N-th round of federated learning, where the first information includes an index of a data packet 1, and the terminal device completes the N-th round of federated learning according to the first information; however, the network device does not generate the new first information for the (N+1)-th round of federated learning, and if the preset rule is "according to the sequence of the indexes of the data packets", then the terminal device determines a data packet 2 as the sample data to be used in the (N+1)-th round of federated learning according to the preset rule in the (N+1)-th round of federated learning, and so on, until the network device generates new first information for the terminal device, and the terminal device performs the model training according to the configuration information indicated in the first information.

As there may be multiple terminal devices participating in federated learning, 2 terminal devices are taken as an example to describe how the network device schedules the training parameters for the multiple terminal devices in detail. In the process of multiple rounds of federated learning, when the data processing rates of different terminal devices are different, then adjustment can be performed in the means in the embodiment shown in FIG. 11 and FIG. 12, including that the respective terminal devices complete the model training within the same training period; however, when the data transmission capabilities of the terminal devices are different, it cannot be solved by dynamically adjusting the amount of the sample data, and therefore, after each round of federated learning, the data amount of the training result sent by the terminal device to the network device is the same, regardless of the amount of the sample data used in the federated learning process. Therefore, when the data transmission capability of the terminal devices is different, it matters that how to ensure that the time delay is not caused when there are multiple terminal devices participating in federated learning.

Figure 17:
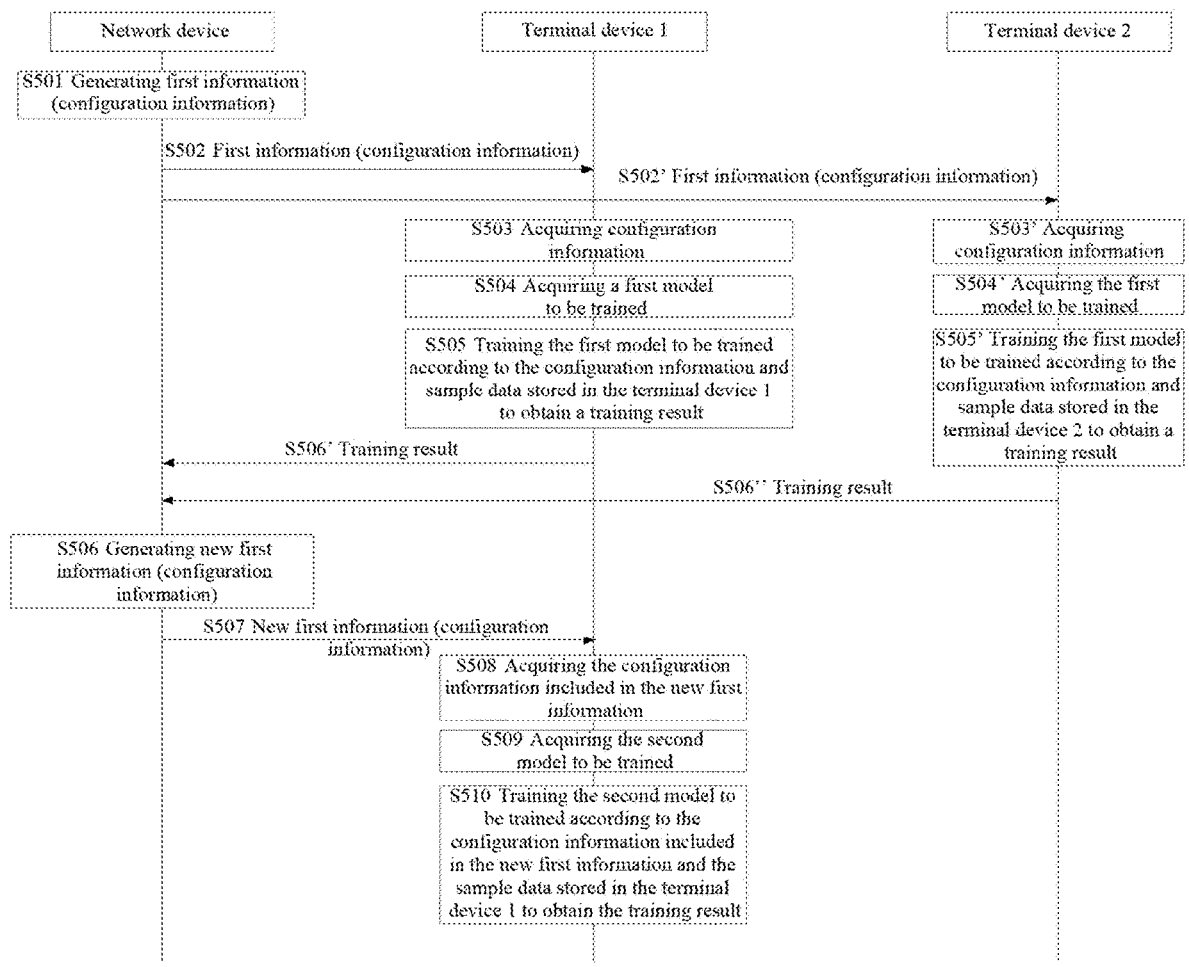
FIG. 17 is a flowchart of a resource scheduling method provided by another embodiment of the present application.

FIG. 17 is a flowchart of a resource scheduling method provided by another embodiment of the present application. In the embodiment shown in FIG. 17, the terminal devices participating in federated learning include: a terminal device 1 and a terminal device 2. The data transmission rate of the terminal device 1 is greater than the data transmission rate of the terminal device 2. The network device determines that both the terminal device 1 and the terminal device 2 can participate in federated learning according to the data transmission capabilities and the data processing rates of the terminal device 1 and the terminal device 2. However, as the data transmission rate of the terminal device 2 is low, the network device may determine that the terminal device 2 selectively participates in some certain rounds of federated learning according to the data transmission rate of the terminal device 2.

Specifically, as shown in FIG. 17, the method of the present embodiment includes:

S501, a network device generates first information.

In this step, the network device generates the first information for the terminal device 1 and the terminal device 2 respectively, the configuration information of the training parameter included in the first information corresponding to the terminal device 1 and the configuration information of the training parameter included in the first information corresponding to the terminal device 2 may be the same, or may be different. The specific implementation for the network device to generate the first information is similar to that of S101 in the embodiment shown in FIG. 4, and reference can be made to the detailed description of the embodiment shown in FIG. 4, and will not be repeated here.

S502, the network device sends the first information to the terminal device 1.

S502', the network device sends the first information to the terminal device 2.

In the present embodiment, the step S502 and S502' are similar to S102 in the embodiment shown in FIG. 4, and reference can be made to the detailed description of the embodiment shown in FIG. 4, which will not be repeated here. It needs to be noted that the executing order of S502 and S502' is not restricted.

S503, the terminal device 1 acquires the configuration information.

S503', the terminal device 2 acquires the configuration information.

In the present embodiment, the step S503 and S503' are similar to S103 in the embodiment shown in FIG. 4, and reference can be made to the detailed description of the embodiment shown in FIG. 4, which will not be repeated here. It needs to be noted that the executing order of S503 and S503' is not restricted.

S504, the terminal device 1 acquires a first model to be trained.

S504', the terminal device 2 acquires a first model to be trained.

For the implementation of acquiring the first model to be trained by the terminal device 1 and the terminal device 2 respectively, reference can be made to the detailed description in the embodiment shown in FIG. 6, which will not be repeated here. It needs to be noted that the executing order of S504 and S504' is not restricted.

S505, the terminal device 1 trains the first model to be trained according to the configuration information and sample data stored in the terminal device 1, to obtain a training result.

S505', the terminal device 2 trains the first model to be trained according to the configuration information and sample data stored in the terminal device 2, to obtain a training result.

In the present embodiment, the terminal device 1 and the terminal device 2 determine the sample data used for model training according to the configuration information respectively, and input the sample data into the model to be trained, to obtain the training result respectively.

That is, the terminal device 1 and the terminal device 2 participate in the first round of federated learning respectively.

In the present embodiment, the network device first generates first information for multiple terminal devices, each first information including configuration information of a training parameter for the terminal device to perform model training, and specifically, the configuration information is used to indicate characteristics of sample data, and/or, characteristics of a model to be trained for the terminal device to perform model training; and then, the network device sends the plurality pieces of first information to the terminal devices, and each terminal device acquires the configuration information included in the first information. In the present embodiment, the network device determines, according to a data processing capability and/or a data transmission capability of the terminal device, that the terminal device participates in a current round of federated learning, and generates and sends the configuration information of the training parameter that matches the terminal device, thereby realizing scheduling of the training parameter in a wireless network.

In some cases, as there is difference among data transmission capabilities of the multiple terminal devices, it may be caused that the time required by the respective terminal devices to upload the training results is different, and it is requested in the federated learning process that the next round of federated learning starts only after each terminal device sends the training result to the network device, and the difference among the data transmission capabilities of the terminal devices will cause the extension of the entire training period. Therefore, the network device may determine whether the terminal device participates in the next round of federated learning according to the data transmission capabilities of the respective terminal devices.

An example is taken where the data transmission capability of the terminal device 2 is half of the data transmission capability of the terminal device 1 for detailed description. When the data transmission capability of the terminal device 2 is half of the data transmission capability of the terminal device 1, the time required by the terminal device 2 to send the training result to the network device is 2 times of the time required by the terminal device 1 to send the training result to the network device, therefore, the network device may determine that the terminal device 2 participates in federated learning every other round according to such characteristics.

In an embodiment, after S505, the method further includes:

S506, a network device generates new first information.

S507, the network device sends the new first information to the terminal device 1.

Correspondingly, the terminal device 1 receives the new first information sent by the network device.

S508, the terminal device 1 acquires the configuration information included in the new first information.

S509, the terminal device 1 acquires a second model to be trained.

S510, the terminal device 1 trains the second model to be trained according to the configuration information included in the new first information and sample data stored in the terminal device 1, to obtain a training result.

In an embodiment, after S505 and S505', the method further includes:

S506', the terminal device 1 uploads the training result.

S506", the terminal device 2 uploads the training result.

That is, S506-S501 is the second round of federated learning, the terminal device 1 participates in the second round of federated learning, while the terminal device 2 does not participate in the second round of federated learning. When the second round of federated learning ends, both the terminal device 1 and the terminal device 2 send all the results of the first round of federated learning to the network device.

After the terminal device 1 trains the second model to be trained according to the configuration information and the sample data stored in the terminal device 1, to obtain the training result in S510, the network device regenerates the new first information for the terminal device 1 and the terminal device 2, and the first information corresponding to the terminal device 1 includes the configuration information of the training parameter to be used by the terminal device 1 to participate in the third round of federated learning; the first information corresponding to the terminal device 2 includes the configuration information of the training parameter to be used by the terminal device 2 to participate in the third round of federated learning. And the new first information is sent to the terminal device 1 and the terminal device 2 respectively, and the terminal device 1 and the terminal device 2 continue executing the process of model training. That is, the method executed after S510 can be similar to S501-S510.

In this solution, the network device indicates the terminal device to selectively participate in some certain rounds of federated learning according to the data transmission capabilities of the respective terminal devices, by which the data resources and the data processing capabilities of the respective terminal devices are effectively used, so that the entire federated learning can have a high training speed, thereby improving the efficiency of federated learning.

In addition, it needs to be noted that, on the basis of the embodiment shown by FIG. 17, if the data transmission rate of the terminal device 1 and/or the terminal device 2 changes, then the network device can re-indicate the terminal device 1 and/or the terminal device 2 to participate in which rounds of federated learning according to the changed data transmission rate of the terminal device 1 and/or the terminal device 2.

In this solution, if there are three or more terminal devices participating in federated learning, the network device may determine which rounds of federated learning each terminal device participates respectively according to the data transmission rates corresponding to all terminal devices respectively, so as to realize maximum utilization of the data resources and data processing capabilities of the respective terminal devices.

Figure 18:
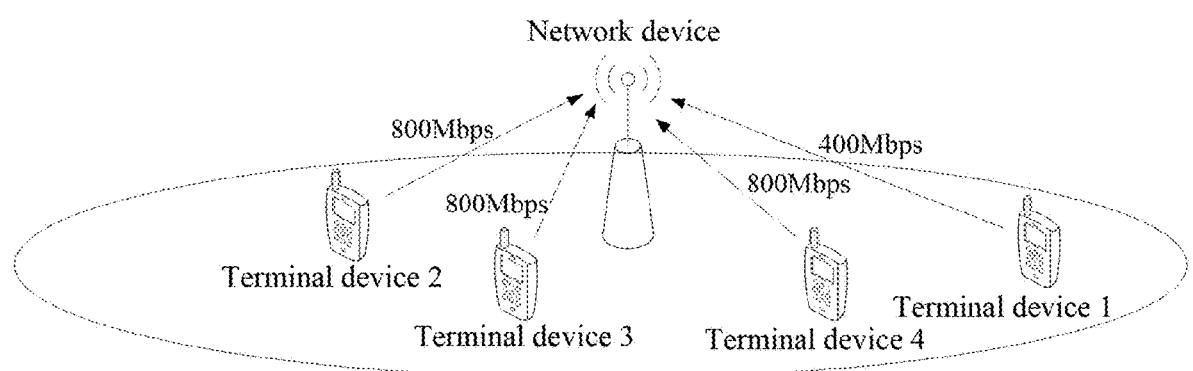
FIG. 18 is a scenario schematic diagram in which multiple terminal devices participate in federated learning provided by an embodiment of the present application.

In a specific embodiment, as shown in FIG. 18, there are four terminal devices participating in federated learning in the cell covered by the network device, which are: a terminal device 1, a terminal device 2, a terminal device 3 and a terminal device 4 respectively. Based on the data amount of the training result needs to be sent to the network device for each round of federated learning, and the model training period supported by the data processing rate of the terminal device, it is determined that the data transmission rate of 800 Mpbs is required to realize sending all the training result in the previous training period to the network device in a training period. For the above four terminal devices, the terminal device 2, terminal device 3 and terminal device 4 are in a good wireless channel condition, which can satisfy the data transmission rate of 800 Mpbs; but the terminal device 1 is in a bad wireless channel condition, which can only satisfy a data transmission rate of 400 Mpbs.

Figure 19:
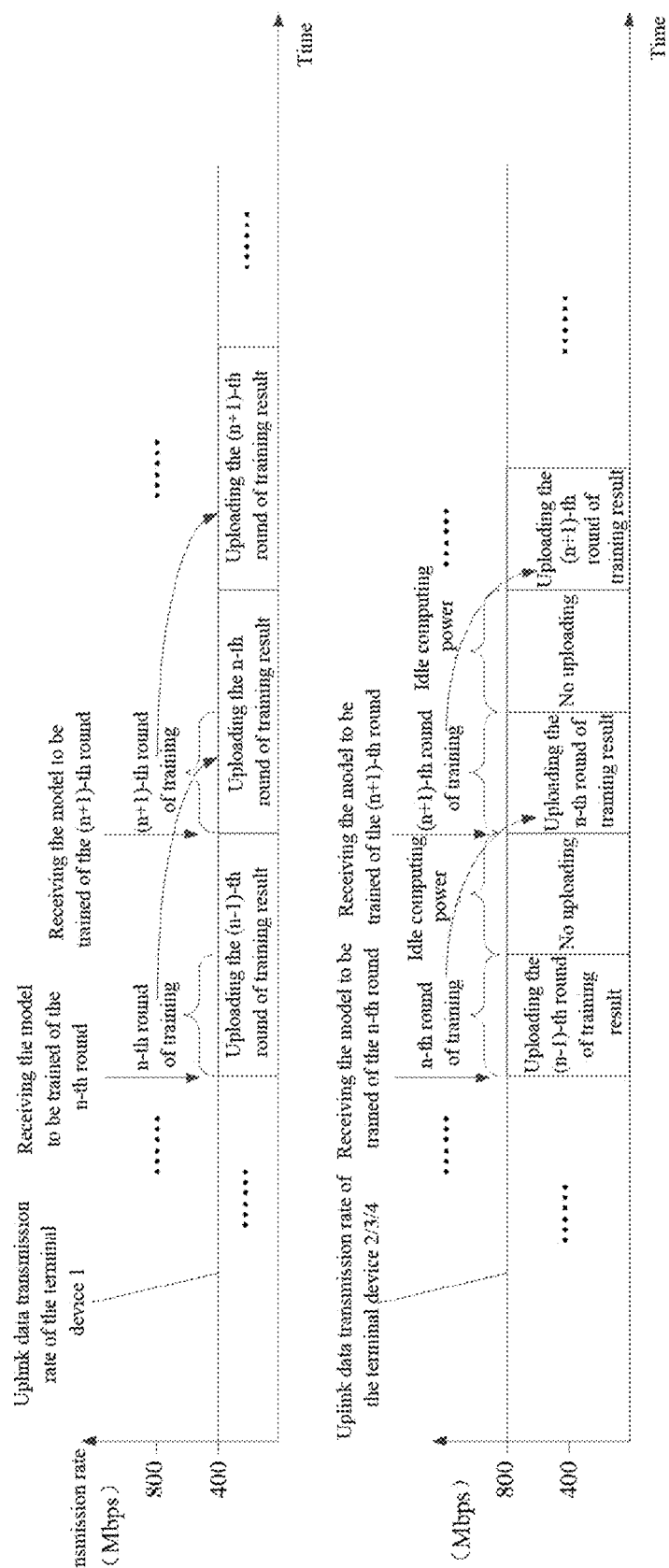
FIG. 19 is a first schematic diagram of change of a training period with time when terminal devices with different data transmission rates participate in federal learning.

Continuing referring to FIG. 19, as the data transmission rate of the terminal device 1 is half of the data transmission rate of the terminal device 2, terminal device 3 and terminal device 4, the time required by the terminal device 1 to send the training result of the (n−1)-th training period to the network device in the n-th training period is 2 times of the time required by the terminal device 2, terminal device 3 and terminal device 4. That is, if the terminal device 1 participates in each round of federated learning, then the training period of the entire federated learning will be doubled, which will cause the training rate to be reduced by half. In addition, the utilization rate of the data processing capabilities of the terminal device 2, terminal device 3 and terminal device 4 is only 50%, where n is an integer greater than or equal to 0.

The network device may instruct the terminal device 1 to participate in federated learning every other round according to the data transmission rates of the terminal device 1, terminal device 2, terminal device 3 and terminal device 4, and in such way, the data processing capabilities of all of the terminal device 1, terminal device 2, terminal device 3 and terminal device 4 are effectively used, thereby ensuring the efficiency of federated learning.

Figure 20:
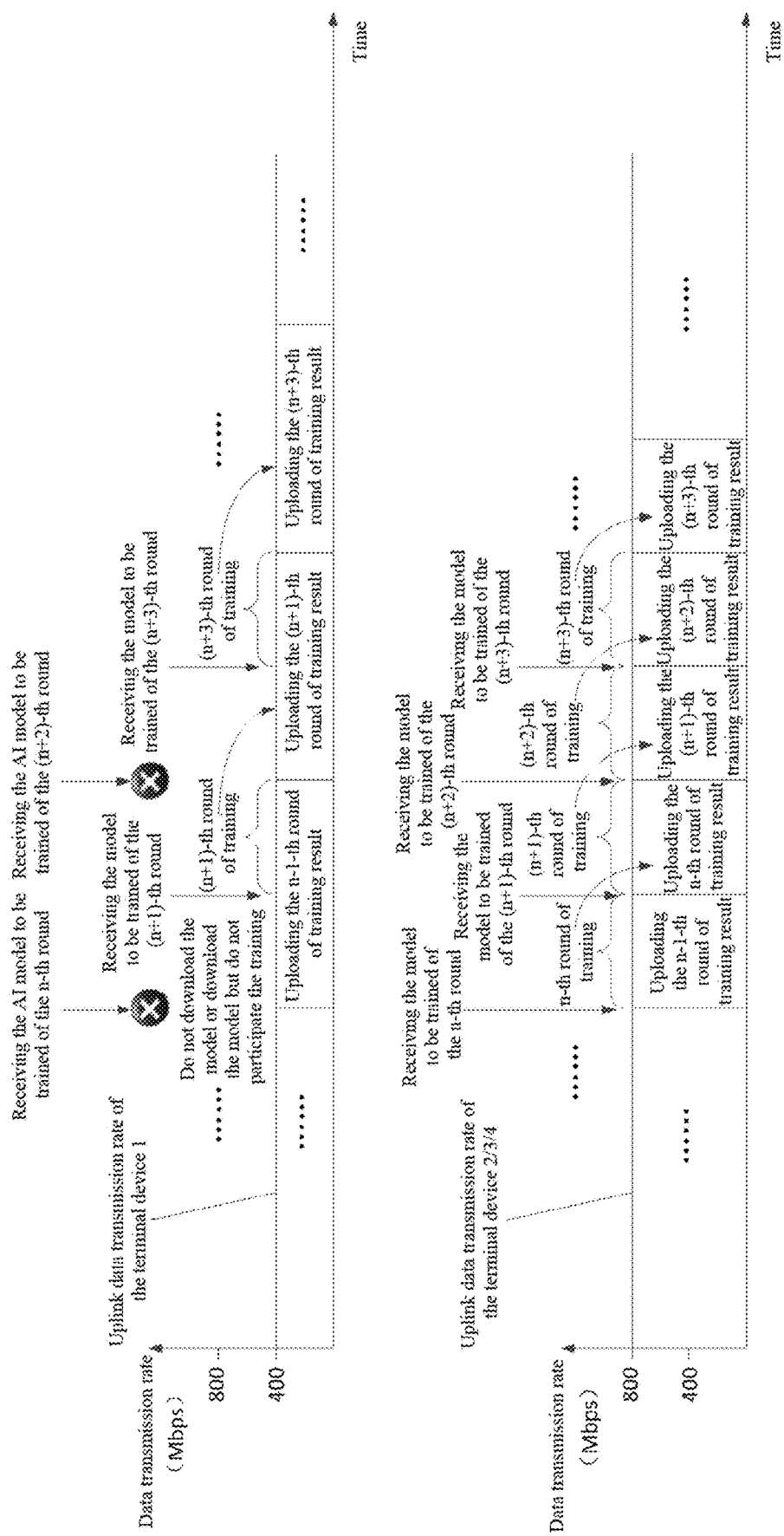
FIG. 20 is a second schematic diagram of change of a training period with time when terminal devices with different data transmission rates participate in federal learning.

That is, as shown in FIG. 20, the network device instructs the terminal device 2, terminal device 3 and terminal device 4 to participate in the n-th round of federated learning, and the terminal device 1 not to participate in the n-th round of federated learning; then instructs the terminal device 1, terminal device 2, terminal device 3 and terminal device 4 to participate in the (n+1)-th round of federated learning; then instructs the terminal device 2, terminal device 3 and terminal device 4 to participate in the (n+2)-th round of federated learning, and instructs the terminal device 1 not to participate in the (n+2)-th round of federated learning; then instructs the terminal device 1, terminal device 2, terminal device 3 and terminal device 4 to participate in the (n+3)-th round of federated learning; the above process is repeated until the data transmission rate or the data processing capability of any terminal device changes, or other reasons, and then the network device may send configuration information of a new training parameter, or federated learning is ended.

It needs to be noted that, in some cases, if the network device instructs the terminal device not to participate in the current round of federated learning, the network device may send the model to be trained to the terminal device, and the terminal device may also acquire the model to be trained but does not execute the operation of model training. Alternatively, the terminal device may determine whether to download the model to be trained according to the indication information sent by the network device.

It needs to be noted that, in FIG. 19-FIG. 20, "computing power" represents the data processing resources.

It also needs to be noted that, in practical communication systems, the methods in the above respective embodiments can be executed separately, or in combination, and the specific implementation of the resource scheduling method provided by the present application is not limited to the several ones described in the above embodiments.

Figure 21:
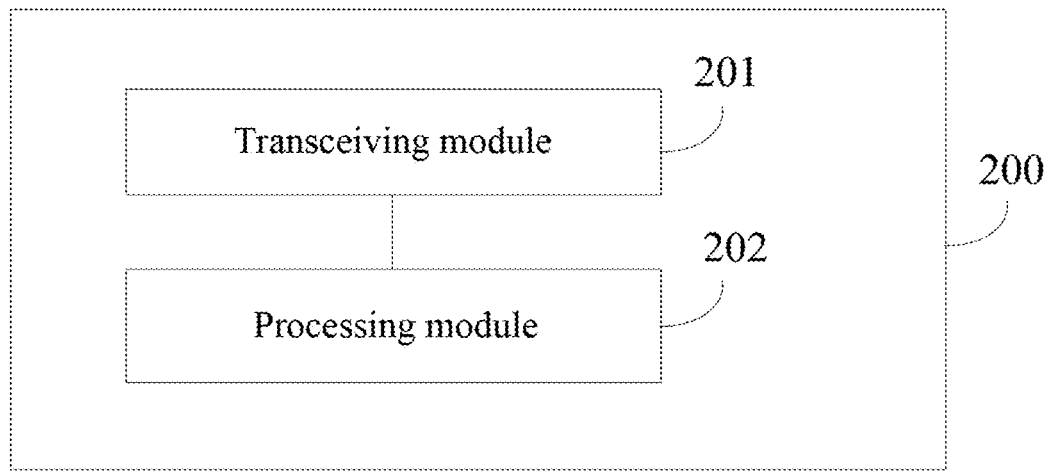
FIG. 21 is a structural schematic diagram of a terminal device provided by an embodiment of the present application.

FIG. 21 is a structural schematic diagram of a terminal device provided by an embodiment of the present application. As shown in FIG. 21, the terminal device 200 provided by the present embodiment includes:

a transceiving module 201, configured to receive first information from a network device, where the first information includes configuration information, and the configuration information is used to indicate any one or any combination of characteristics of sample data, and characteristics of a model to be trained for the terminal device to perform model training; and a processing module 202, configured to acquire the configuration information.

The terminal device provided by the present embodiment is configured to perform the technical solution of the terminal device side in any one of the above method embodiments, and the implementation principle and technical effect are similar, which will not be repeated here.

On the basis of the embodiment shown in FIG. 21, in some possible designs, the configuration information includes any one or any combination of indication information of a type of the sample data, indication information of an amount of the sample data, and indication information of a data packet to which the sample data belongs.

In some possible designs, the configuration information includes an identifier of the model to be trained.

In some possible designs, the amount of the sample data is determined according to a rate at which the terminal device processes the sample data.

In some possible designs, the transceiving module 201 is specifically configured to receive the first information through downlink control information (DCI), or a downlink media access control layer control element (MAC CE) signaling, or a higher-layer configuration signaling, or control information of an application layer.

In some possible designs, the model to be trained is obtained by performing federated averaging processing according to models obtained by performing model training by at least two terminal devices in a previous training period.

In some possible designs, the processing module 202 is further configured to train the model to be trained according to the configuration information and sample data stored in the terminal device, to obtain a training result.

In some possible designs, when the configuration information includes indication information of a type of the sample data;

the processing module 202 is specifically configured to acquire, according to the type indicated by the configuration information, sample data corresponding to the type from the sample data stored in the terminal device, and train the model to be trained according to an amount of the sample data adopted for model training in the previous training period, to obtain the training result.

In some possible designs, when the configuration information includes indication information of an amount of the sample data;

the processing module 202 is specifically configured to acquire, according to the amount indicated by the configuration information, the corresponding amount of sample data from the sample data stored in the terminal device, and train the model to be trained according to a type of the sample data adopted for model training in the previous training period, to obtain the training result.

In some possible designs, when the configuration information includes indication information of a data packet to which the sample data belongs;

the processing module 202 is specifically configured to train the model to be trained according to the sample data in the data packet indicated by the configuration information, to obtain the training result.

In some possible designs, the transceiving module 201 is further configured to send the training result to the network device.

In some possible designs, the transceiving module 201 is further configured to send a training result obtained in the previous training period to the network device when the model to be trained is acquired in a current training period.

In some possible designs, the transceiving module 201 is further configured to acquire the model to be trained from multiple models received from the network device in advance.

In some possible designs, the transceiving module 201 is specifically configured to determine the model to be trained from the multiple models according to an identifier of the model to be trained.

In some possible designs, the multiple models is acquired by the transceiving module 201 from the network device through a broadcast channel or a multicast channel.

In some possible designs, the multiple models are sent by the network device and received, according to second information, by the transceiving module 201 through a unicast channel or a group common channel; where the second information includes an identifier of the terminal device or a group identifier of the terminal device, and the second information is used to indicate the terminal device to receive the multiple models.

In some possible designs, the second information is sent through a unicast channel or a group common channel.

In some possible designs, the transceiving module 201 is specifically configured to determine the model to be trained from the multiple models according to the indication information of a preset position;

the indication information of the preset position is used to indicate a position of the model to be trained in the multiple models.

Figure 22:
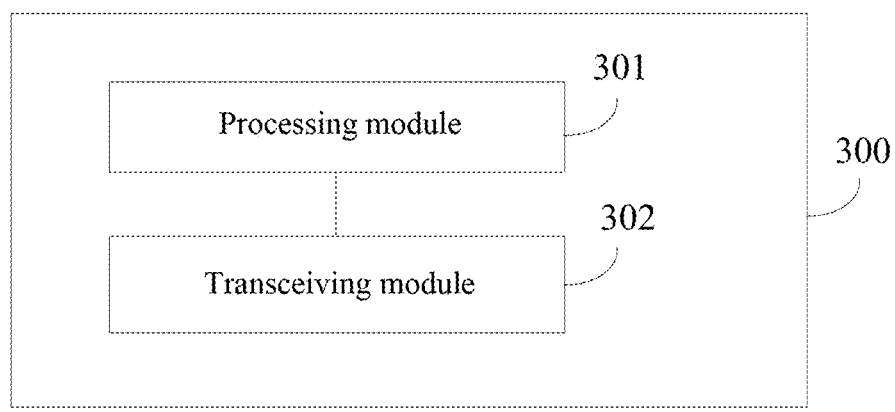
FIG. 22 is a structural schematic diagram of a network device provided by an embodiment of the present application.

FIG. 22 is a structural schematic diagram of a network device provided by an embodiment of the present application. As shown in FIG. 22, the network device 300 of the present embodiment includes:

a processing module 301, configured to generate first information, where the first information includes configuration information, and the configuration information is used to indicate any one or any combination of characteristics of sample data, and characteristics of a model to be trained for a terminal device to perform model training; and a transceiving module 302, configured to send the first information to the terminal device.

The network device provided by the present embodiment is configured to perform the technical solution of the network device side in any one of the above method embodiment, and the implementation principle and technical effect are similar, which will not be repeated here.

In some possible designs, the configuration information includes any one or any combination of indication information of a type of the sample data, indication information of an amount of the sample data, and indication information of a data packet to which the sample data belongs.

In some possible designs, the configuration information includes an identifier of the model to be trained.

In some possible designs, the amount of the sample data is determined according to a rate at which the terminal device processes the sample data.

In some possible designs, the transceiving module 302 is specifically configured to send the first information to the terminal device through downlink control information (DCI), or a downlink media access control layer control element (MAC CE) signaling, or a higher-layer configuration signaling, or control information of an application layer.

In some possible designs, the model to be trained is obtained by performing, by the network device, federated averaging processing according to models obtained by performing model training by at least two terminal devices in a previous training period.

In some possible designs, the transceiving module 302 is further configured to receive a training result from the terminal device in a next training period.

In some possible designs, the transceiving module 302 is further configured to receive a training result obtained in a previous training period sent by the terminal device when the terminal device acquires the model to be trained in a current training period.

In some possible designs, the transceiving module 302 is further configured to send multiple models to the terminal device, where the multiple models include the model to be trained.

In some possible designs, the multiple models are sent by the transceiving module 302 to the terminal device through a broadcast channel or a multicast channel.

In some possible designs, the multiple models are sent by the transceiving module 302 to the terminal device through a unicast channel or a group common channel.

In some possible designs, the transceiving module 302 is further configured to send second information to the terminal device, where the second information includes an identifier of the terminal device or a group identifier of the terminal device, and the second information is used to indicate the terminal device to receive the multiple models.

In some possible designs, the second information is sent through a unicast channel or a group common channel.

Figure 23:
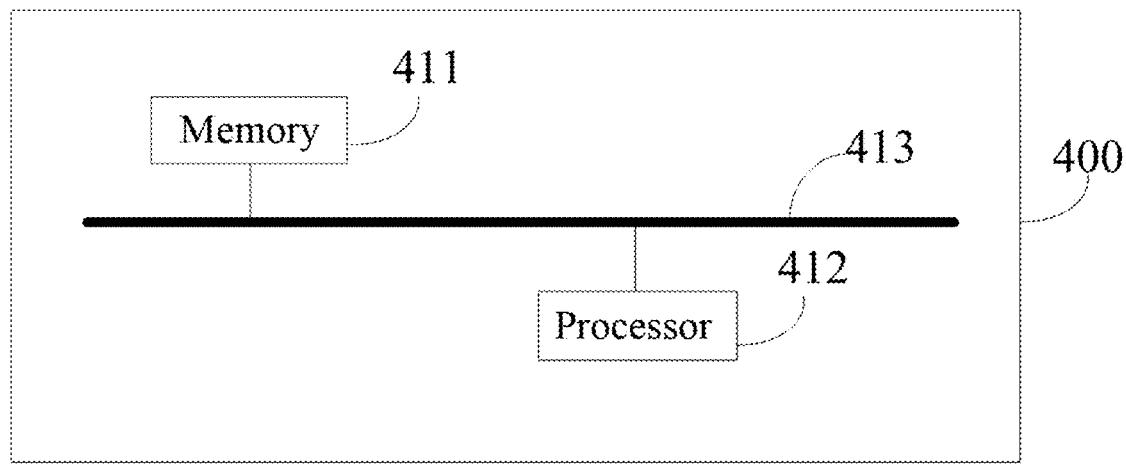
FIG. 23 is a structural schematic diagram of a terminal device provided by another embodiment of the present application.

FIG. 23 is a structural schematic diagram of a second embodiment of a terminal device provided by the present application, and as shown in FIG. 23, the terminal device 400 includes:

a processor 411, a memory 412, and an interface 413 for communicating with a network device;

the memory 412 stores a computer-executable instruction;

the processor 411 executes the computer-executable instruction stored in the memory 412 to cause the processor 411 to perform the technical solution of the terminal device side in any one of the above method embodiments.

FIG. 23 is a simple design of the terminal device, and the number of processors and the number of memories are not limited in the embodiments of the present application, and only a number of 1 is taken as an example for description in FIG. 23.

Figure 24:
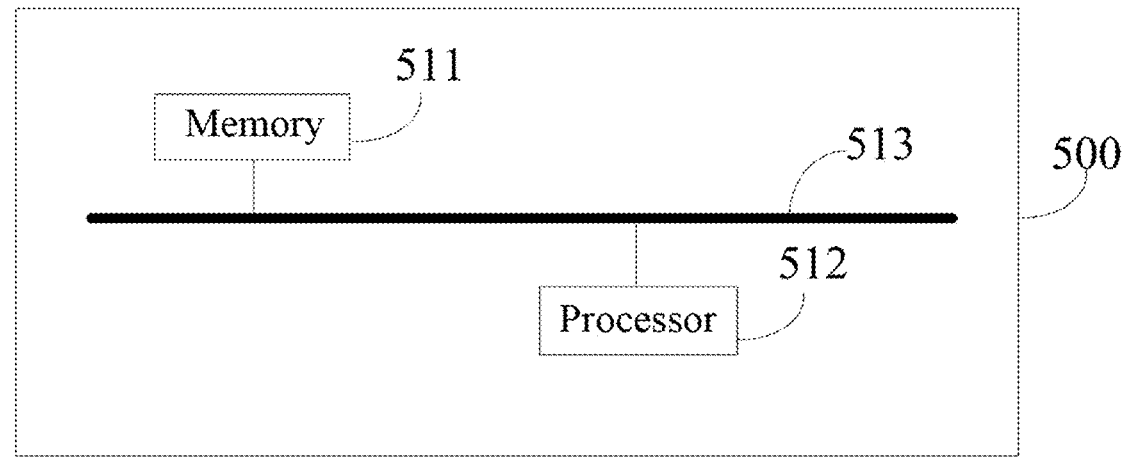
FIG. 24 is a structural schematic diagram of a network device provided by another embodiment of the present application.

FIG. 24 is a structural schematic diagram of a second embodiment of a network device provided by the present application, and as shown in FIG. 24, the network device 500 includes:

a processor 511, a memory 512, and an interface 513 for communicating with a terminal device;

the memory 512 stores a computer-executable instruction;

the processor 511 executes the computer-executable instruction stored in the memory 512 to cause the processor 511 to perform the technical solution of the network device side in any one of the above method embodiments.

FIG. 24 is a simple design of the network device, and the number of processors and number of memories are not limited in the embodiments of the present application, and only a number of 1 is taken as an example for description in FIG. 24.

In a specific implementation of the terminal device shown in FIG. 23 and the network device shown in FIG. 24, the memory, the processor and the interface can be connected by a bus, and in an embodiment, the memory can be integrated inside the processor.

Embodiments of the present application also provide a computer-readable storage medium, where the computer-readable storage medium stores a computer-executable instruction, and the computer-executable instruction is used to, when executed by a processor, implement the technical solution of the terminal device in any one of the above method embodiments.

Embodiments of the present application also provide a computer-readable storage medium, where the computer-readable storage medium stores a computer-executable instruction, and the computer-executable instruction is used to, when executed by a processor, implement the technical solution of the network device in any one of the above method embodiments.

Embodiments of the present application also provide a program, and the program is used to, when executed by a processor, perform the technical solution of the terminal device in any one of the above method embodiments.

Embodiments of the present application also provide a program, and the program is used to, when executed by a processor, perform the technical solution of the network device in any one of the above method embodiments.

In an embodiment, the processor may be a chip.

Embodiments of the present application also provide a computer program product, including a program instruction, and the program instruction is used to implement the technical solution of the terminal device in any one of the above method embodiments.

Embodiments of the present application also provide a computer program product, including a program instruction, and the program instruction is used to implement the technical solution of the network device in any one of the above method embodiments.

Embodiments of the present application also provide a chip, including: a processing module and a communicating interface, where the processing module can perform the technical solution of the terminal device side in any one of the above method embodiments.

Further, the chip further includes a storing module (for example, a memory) used to store instructions, and the processing module is used to execute the instructions stored in the storing module to cause the processing module to perform the technical solution of the terminal device side in any one of the above method embodiments.

Embodiments of the present application also provide a chip, including: a processing module and a communicating interface, where the processing module can perform the technical solution of the network device side in any one of the above method embodiments.

Further, the chip further includes a storing module (for example, a memory) used to store instructions, and the processing module is used to execute the instructions stored in the storing module to cause the processing module to perform the technical solution of the network device side in any one of the above method embodiments.

In several embodiments provided by the present application, it should be understood that the disclosed device and method can be implemented in other ways. For example, the device embodiments described above are only illustrative, for example, the division of the modules is only a division of logical function, and there may be other ways of division in actual implementation, for example, multiple modules can be combined or integrated into another system, or some features can be ignored or not performed. On the other hand, the mutual coupling or direct coupling or communication connection shown or discussed may be indirect coupling or communication connection through some interfaces and modules, and may be in electrical, mechanical or other forms.

In the specific implementation of the above terminal device and network device, it should be understood that the processor can be a central processing unit (abbreviated as CPU), other general purpose processors, digital signal processors (abbreviated as DSP), application specific integrated circuits (abbreviated as ASIC), etc. The general purpose processor may be a microprocessor or the processor may be any conventional processors or the like. The steps of the method disclosed in the present application can be directly implemented by a hardware processor or implemented by a combination of hardware and software modules in the processor.

All or part of the steps to realize the above-mentioned method embodiments can be completed by hardware related to program instructions. The above mentioned program can be stored in a readable memory. When the program is executed, the steps including the above mentioned method embodiments are performed; and the above mentioned memory (storage medium) includes: read-only memory (abbreviated as ROM), RAM, flash memory, hard disk, solid state disk, magnetic tape, floppy disk, optical disc and any combination thereof.

What is claimed is:

1. A resource scheduling method, comprising:
receiving, by a terminal device, first information from a network device, wherein the first information comprises configuration information, and the configuration information is used to indicate characteristics of sample data for the terminal device to perform model training on a model to be trained, wherein the configuration information comprises indication information of an amount of the sample data, wherein the amount of the sample data is determined according to a rate at which the terminal device processes the sample data and transmits data in a current training period; and
acquiring, by the terminal device, the configuration information;
acquiring, by the terminal device according to the amount indicated by the configuration information, a corresponding amount of sample data from sample data stored in the terminal device, and training the model to be trained using the corresponding amount of sample data according to a type of sample data adopted for the model training in a previous training period, to obtain a training result.

2. The method according to claim 1, wherein the configuration information comprises an identifier of the model to be trained.

3. The method according to claim 1, wherein the method further comprises: sending, by the terminal device, the training result to the network device.

4. The method according to claim 1, wherein the method further comprises:
acquiring, by the terminal device, the model to be trained from multiple models received from the network device in advance.

5. The method according to claim 1, wherein the configuration information further comprises characteristics of the model to be trained.

6. A resource scheduling method, comprising:
generating, by a network device, first information, wherein the first information comprises configuration information, and the configuration information is used to indicate characteristics of sample data for the terminal device to perform model training on a model to be trained, wherein the configuration information comprises indication information of an amount of the sample data, wherein the amount of the sample data is determined according to a rate at which the terminal device processes the sample data and transmits data in a current training period, wherein the amount of the sample data is used by the terminal device to determine a corresponding amount of sample data from sample data stored in the terminal device, and the model training is performed by the terminal device using the corresponding amount of sample data according to a type of sample data adopted for the model training in a previous training period; and
sending, by the network device, the first information to the terminal device.

7. The method according to claim 6, wherein the configuration information comprises an identifier of the model to be trained.

8. The method according to claim 6, wherein the sending, by the network device, the first information to the terminal device comprises:

sending, by the network device, the first information to the terminal device through downlink control information DCI, or a downlink media access control layer control element MAC CE signaling, or a higher-layer configuration signaling, or control information of an application layer.

9. The method according to claim 6, wherein the model to be trained is obtained by performing federated averaging processing by the network device according to models obtained by performing model training by at least two terminal devices in a previous training period.

10. The method according to claim 6, wherein the method further comprises:

receiving, by the network device, a training result obtained in the previous training period sent by the terminal device when the terminal device acquires the model to be trained in a current training period.

11. A network device, comprising:

a processor, a memory, and an interface for communicating with a terminal device;

the memory stores a computer-executable instruction;

the processor executes the computer-executable instruction stored in the memory to cause the processor to:

generate first information, wherein the first information comprises configuration information, and the configuration information is used to indicate characteristics of sample data for the terminal device to perform model training on a model to be trained, wherein the configuration information comprises indication information of an amount of the sample data, wherein the amount of the sample data is determined according to a rate at which the terminal device processes the sample data and transmits data in a current training period; and send the first information to the terminal device;

acquire, according to the amount indicated by the configuration information, a corresponding amount of sample data from sample data stored in the terminal device, and train the model to be trained using the corresponding amount of sample data according to a type of the sample data adopted for the model training in a previous training period, to obtain a training result.

12. The network device according to claim 11, wherein the processor is further configured to:

send multiple models to the terminal device, wherein the multiple models comprise the model to be trained.

13. The network device according to claim 12, wherein the multiple models are sent by the network device to the terminal device through a unicast channel or a group common channel.

14. The network device according to claim 13, wherein the processor is further configured to:

send second information to the terminal device, wherein the second information comprises an identifier of the terminal device or a group identifier of the terminal device and the second information is used to indicate the terminal device to receive the multiple models.

* * * * *